US009766482B2

(12) United States Patent
Cazalet et al.

(10) Patent No.: US 9,766,482 B2
(45) Date of Patent: Sep. 19, 2017

(54) WEARABLE DEVICE WITH INPUT AND OUTPUT STRUCTURES

(71) Applicant: Google Inc., Mountain View, CA (US)

(72) Inventors: Peter Michael Cazalet, Los Gatos, CA (US); Joseph John Hebenstreit, San Francisco, CA (US); Matthew Wyatt Martin, Ross, CA (US); Maj Isabelle Olsson, San Francisco, CA (US); Mitchell Joseph Heinrich, San Francisco, CA (US); Hayes Solos Raffle, Palo Alto, CA (US); Eliot Kim, Los Gatos, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 15/010,818

(22) Filed: Jan. 29, 2016

(65) Prior Publication Data

US 2016/0147086 A1    May 26, 2016

Related U.S. Application Data

(62) Division of application No. 13/435,944, filed on Mar. 30, 2012, now Pat. No. 9,291,823.

(51) Int. Cl.
*G02C 5/10* (2006.01)
*G02C 11/00* (2006.01)
(Continued)

(52) U.S. Cl.
CPC .......... *G02C 11/10* (2013.01); *G02B 27/0176* (2013.01); *G02C 5/008* (2013.01);
(Continued)

(58) Field of Classification Search
CPC ... G02C 5/00–5/10; G02C 5/126; G02C 5/14; G02C 11/10; G02C 13/00;
(Continued)

(56) References Cited

U.S. PATENT DOCUMENTS

| 4,810,080 A | 3/1989 | Grendol et al. |
| 4,867,551 A | 9/1989 | Perera |

(Continued)

FOREIGN PATENT DOCUMENTS

| CN | 1289938 C | 12/2006 |
| CN | 200962165 Y | 10/2007 |

(Continued)

OTHER PUBLICATIONS

International Search Report and Written Opinion for Application No. PCt/US2013/034317 dated Jun. 26, 2013.

(Continued)

*Primary Examiner* — Huy K Mai
(74) *Attorney, Agent, or Firm* — Lerner, David, Littenberg, Krumholz & Mentlik, LLP

(57) ABSTRACT

A head-wearable device includes a center support extending in generally lateral directions, a first side arm extending from a first end of the center frame support and a second side arm extending from a second end of the center support. The device may further include a nosebridge that is removably coupled to the center frame support. The device may also include a lens assembly that is removably coupled to the center support or the nosebridge. The lens assembly may have a single lens, or a multi-lens arrangement configured to cooperate with display to correct for a user's ocular disease or disorder.

12 Claims, 16 Drawing Sheets

(51) Int. Cl.
*G02C 7/02* (2006.01)
*G02C 5/02* (2006.01)
*G02C 5/00* (2006.01)
*G02C 5/12* (2006.01)
*G02C 5/14* (2006.01)
*G02C 5/16* (2006.01)
*G02B 27/01* (2006.01)

(52) U.S. Cl.
CPC ............... *G02C 5/02* (2013.01); *G02C 5/10* (2013.01); *G02C 5/12* (2013.01); *G02C 5/143* (2013.01); *G02C 5/16* (2013.01); *G02C 7/02* (2013.01); *G02B 2027/0156* (2013.01); *G02B 2027/0178* (2013.01); *G02C 2200/08* (2013.01)

(58) Field of Classification Search
CPC ............. G02C 13/001; G02C 2200/08; G02C 2200/10; G02C 1/02; G02C 1/026
USPC .......... 351/103–109, 124–135, 158
See application file for complete search history.

(56) References Cited

U.S. PATENT DOCUMENTS

| | | | |
|---|---|---|---|
| D327,079 S | 6/1992 | Allen | |
| 5,175,571 A | 12/1992 | Tanefsky et al. | |
| D334,557 S | 4/1993 | Hunter et al. | |
| D337,320 S | 7/1993 | Hunter et al. | |
| D402,651 S | 12/1998 | Depay et al. | |
| 6,034,653 A * | 3/2000 | Robertson | G02B 27/0176 345/8 |
| D436,960 S | 1/2001 | Budd et al. | |
| 6,204,974 B1 | 3/2001 | Spitzer | |
| 6,356,392 B1 | 3/2002 | Spitzer | |
| 6,480,174 B1 | 11/2002 | Kaufmann et al. | |
| 6,502,938 B2 * | 1/2003 | Yoshimura | G02C 5/06 351/103 |
| 6,666,554 B2 | 12/2003 | Mulvey | |
| D512,985 S | 12/2005 | Travers et al. | |
| D559,250 S | 1/2008 | Pombo et al. | |
| D565,082 S | 3/2008 | McClure et al. | |
| D602,064 S | 10/2009 | Mitsui et al. | |
| 7,631,968 B1 | 12/2009 | Dobson et al. | |
| 7,648,236 B1 | 1/2010 | Dobson | |
| 7,675,683 B2 | 3/2010 | Dobson et al. | |
| D646,316 S | 10/2011 | Zhao | |
| 2003/0123022 A1 | 7/2003 | Mulvey | |
| 2005/0219152 A1 | 10/2005 | Budd et al. | |
| 2006/0168859 A1 | 8/2006 | Pombo et al. | |
| 2009/0251661 A1 | 10/2009 | Fuziak, Jr. | |
| 2010/0045927 A1 | 2/2010 | Moliton et al. | |
| 2010/0045928 A1 | 2/2010 | Levy | |
| 2011/0213664 A1 | 9/2011 | Osterhout et al. | |
| 2012/0032874 A1 | 2/2012 | Mukawa | |
| 2012/0081658 A1 | 4/2012 | Sugihara et al. | |
| 2013/0235331 A1 | 9/2013 | Heinrich et al. | |
| 2013/0250503 A1 * | 9/2013 | Olsson | G02C 5/12 361/679.03 |

FOREIGN PATENT DOCUMENTS

| | | |
|---|---|---|
| EP | 2169444 A1 | 3/2010 |
| JP | H08-015652 A | 1/1996 |
| JP | 2001194629 A | 7/2001 |
| JP | 2010226680 A | 10/2010 |
| JP | 2012509497 A | 4/2012 |
| TW | M306334 U | 2/2007 |
| WO | 20100092904 A1 | 8/2010 |
| WO | 2012026563 A1 | 3/2012 |

OTHER PUBLICATIONS

Extended European Search Report for EP Patent Application No. 13770293.2 dated Jan. 28, 2016.
Notice of Reasons for Rejection for Japanese Patent Application No. 2015-503567, dated Mar. 3, 2016.
Notification of First Office Action for Chinese Patent Application No. 201380028416.8 dated Feb. 1, 2016.
Notification of the Second Office Action for Chinese Patent Application No. 201380028416.8 dated Oct. 8, 2016.
Examination Report for Taiwanese Patent Application No. 102110574, dated Aug. 3, 2016.

* cited by examiner

WEARABLE DEVICE WITH INPUT AND OUTPUT STRUCTURES

CROSS-REFERENCES TO RELATED APPLICATIONS

The present application is a divisional of U.S. patent application Ser. No. 13/435,944, filed on Mar. 30, 2012, the disclosure of which is incorporated herein by reference.

BACKGROUND

Personal video or image displays are devices that are used to display an image received from a source for viewing by a single user. Such devices can be in the form of head-mounted displays that are worn on the head of a user and include one or more image sources over or in front of the user's eyes. Head-mounted displays can include an image source positioned adjacent and associated with each eye of the user or wearer and can be configured to present the same image, viewable as a single two-dimensional image. Alternatively, some such devices can be configured to present different stereoscopic images that are interpreted by the viewer as a single three-dimensional image. Regardless of the type of image presented to the user, such devices are usually blacked-out. That is, they almost entirely obstruct the wearer's vision outside of the screen or other image source included therein so that the user can see nothing but the image presented by the device's display system.

Other personal image displays can be what is referred to as a heads-up display, wherein the image is displayed on, in, or through a transparent display that superimpose the displayed image over a view of the surrounding environment. These allow the user to view the image presented by the display simultaneously with their surroundings. Such devices, however, can have many limitations, including in their fit and comfort to their wearers as well as limited functionality.

Both head-mounted and heads-up displays can be connected to a video source that receives a video signal that the device can read and convert into the image that they present to the user. The video source can be received from a portable device such as a video player, a portable media player or computers. Some such display devices are also configured to receive sound signals, which are delivered to the user typically through incorporated headphones. The functionality of these types of displays is, however, limited to passive actions wherein the display simply receives information from an external source and presents it to the wearer in limited forms. Additionally, some displays may not be easily configured for persons with ocular diseases or disorders, such as those persons who require corrective lenses. In these instances, some displays may not cooperate with such corrective lenses, thereby causing a person to wear the display without the benefit of their corrective lenses. In this scenario, the person may have difficulty resolving the images being presented by the displays.

BRIEF SUMMARY

An aspect of the disclosure relates to a head-wearable device including a center frame support, a first side arm extending from a first end of the center frame support, and a second side arm extending from a second end of the center support. The device may further include a nosebridge including a crosspiece, with the crosspiece being removably coupled to the center frame support. At least one lens may be attached to the crosspiece, and the device may further include a display element attached to at least one of the first side arm or the second side arm. The display element may be positionable adjacent the at least one lens.

In an example, the center frame support may include a connection section, and the crosspiece of the nosebridge may be removably coupled to the connection section of the center frame support. In another example, the nosebridge may further include a pair of nose pads. In yet another example, the at least one lens may be positionable between the display element and an eye of a user when the device is worn on the user's head.

Another aspect of the disclosure relates to a head-wearable device including a center frame support, a first side arm extending from a first end of the center frame support, and a second side arm extending from a second end of the center support. The device may further include a nosebridge attached to the center frame support, and at least one lens removably coupled to the nosebridge. The device may further include a display element attached to at least one of the first side arm or the second side arm and positionable adjacent the lens.

In one example, the nosebridge may further include a pair of bridge arms. In another example, the at least one lens may include a clip configured to engage with at least one of the bridge arms. In another example, the at least one lens may include two lenses, with each of the two lenses having a clip configured to engage with a respective one of the pair of the bridge arms. The clips may be configured to engage with interior surfaces of the bridge arms, or the clips may be configured to engage with exterior surfaces of the bridge arms.

Another aspect of the disclosure relates to head-wearable device including a center frame support, a first side arm extending from a first end of the center frame support, and a second side arm extending from a second end of the center support. The device may further include a nosebridge attached to the center frame support, and a display element, having first and second opposed sides, attached to at least one of the first side arm and the second side arm. A first lens may be positioned adjacent the first side of the display element, and a second lens may be positioned adjacent the second side of the display element. A third lens may be positioned adjacent one of the first lens and second lens.

Another aspect of the disclosure relates to a head-wearable device kit, including a center frame support, a first side arm configured to extend from a first end of the center frame support, and a second side arm configured to extend from a second end of the center support. The kit may further include a display element attachable to at least one of the first side arm or the second side arm. The kit may further include at least one lens configured for removable attachment with the head-wearable device in a position adjacent the display element.

In one example, the kit may include a nosebridge removably affixable to the center frame support, and the at least one lens may be configured to attach to the nosebridge. In another example, the kit may include a nosebridge affixable to the center support and having a plurality of bridge arms, and the at least one lens may be configured to attach to one of the plurality of bridge arms.

Another aspect of the disclosure relates to a sleeve configured to removably attach to a display element of a head-wearable device. The sleeve may include a first lens and a second lens. The second lens may be configured to provide vision correction according to a prescription that is inverse of the first lens. The sleeve may further include a pair of support surfaces configured to secure the first lens at a fixed distance from the second lens forming an opening therebetween. The opening may be configured to receive a display element of a head-wearable device.

DETAILED DESCRIPTION

Figure 1:
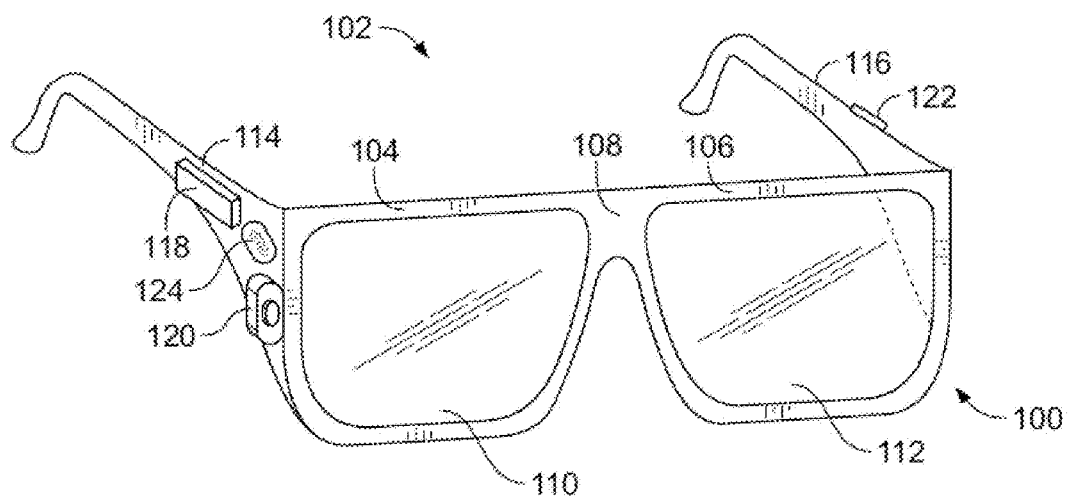
FIG. 1 shows an exemplary system for receiving, transmitting, and displaying data.

Embodiments of the present disclosure are described herein with reference to the drawing figures. FIG. 1 illustrates an example system 100 for receiving, transmitting, and displaying data. The system 100 is shown in the form of a wearable computing device. While FIG. 1 illustrates a head-mounted device 102 as an example of a wearable computing device, other types of wearable computing devices could additionally or alternatively be used. As illustrated in FIG. 1, the head-mounted device 102 comprises frame elements including lens-frames 104, 106 and a center frame support 108, lens elements 110, 112, and extending side-arms 114, 116. The center frame support 108 and the extending side-arms 114, 116 are configured to secure the head-mounted device 102 to a user's face via a user's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the head-mounted device 102. Other materials may be possible as well.

One or more of each of the lens elements 110, 112 may be formed of any material that can suitably display a projected image or graphic. Each of the lens elements 110, 112 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 114, 116 may each be projections that extend away from the lens-frames 104, 106, respectively, and may be positioned behind a user's ears to secure the head-mounted device 102 to the user. The extending side-arms 114, 116 may further secure the head-mounted device 102 to the user by extending around a rear portion of the user's head. Additionally or alternatively, for example, the system 100 may connect to or be affixed within a head-mounted helmet structure. Other possibilities exist as well.

The system 100 may also include an on-board computing system 118, a video camera 120, a sensor 122, and a finger-operable touch pad 124. The on-board computing system 118 is shown to be positioned on the extending side-arm 114 of the head-mounted device 102; however, the on-board computing system 118 may be provided on other parts of the head-mounted device 102 or may be positioned remote from the head-mounted device 102 (e.g., the on-board computing system 118 could be wire- or wirelessly-connected to the head-mounted device 102). The on-board computing system 118 may include a processor and memory, for example. The on-board computing system 118 may be configured to receive and analyze data from the video camera 120 and the finger-operable touch pad 124 (and possibly from other sensory devices, user interfaces, or both) and generate images for output by the lens elements 110 and 112.

The video camera 120 is shown positioned on the extending side-arm 114 of the head-mounted device 102; however, the video camera 120 may be provided on other parts of the head-mounted device 102. The video camera 120 may be configured to capture images at various resolutions or at different frame rates. Many video cameras with a small form-factor, such as those used in cell phones or webcams, for example, may be incorporated into an example of the system 100.

Further, although FIG. 1 illustrates one video camera 120, more video cameras may be used, and each may be configured to capture the same view, or to capture different views. For example, the video camera 120 may be forward facing to capture at least a portion of the real-world view perceived by the user. This forward facing image captured by the video camera 120 may then be used to generate an augmented reality where computer generated images appear to interact with the real-world view perceived by the user.

The sensor 122 is shown on the extending side-arm 116 of the head-mounted device 102; however, the sensor 122 may be positioned on other parts of the head-mounted device 102. The sensor 122 may include one or more of a gyroscope or an accelerometer, for example. Other sensing devices may be included within, or in addition to, the sensor 122 or other sensing functions may be performed by the sensor 122.

The finger-operable touch pad 124 is shown on the extending side-arm 114 of the head-mounted device 102. However, the finger-operable touch pad 124 may be positioned on other parts of the head-mounted device 102. Also, more than one finger-operable touch pad may be present on the head-mounted device 102. The finger-operable touch pad 124 may be used by a user to input commands. The finger-operable touch pad 124 may sense at least one of a position and a movement of a finger via capacitive sensing, resistance sensing, or a surface acoustic wave process, among other possibilities. The finger-operable touch pad 124 may be capable of sensing finger movement in a direction parallel or planar to the pad surface, in a direction normal to the pad surface, or both, and may also be capable of sensing a level of pressure applied to the pad surface. The finger-operable touch pad 124 may be formed of one or more translucent or transparent insulating layers and one or more translucent or transparent conducting layers. Edges of the finger-operable touch pad 124 may be formed to have a raised, indented, or roughened 20 surface, so as to provide tactile feedback to a user when the user's finger reaches the edge, or other area, of the finger-operable touch pad 124. If more than one finger-operable touch pad is present, each finger-operable touch pad may be operated independently, and may provide a different function.

Figure 2:
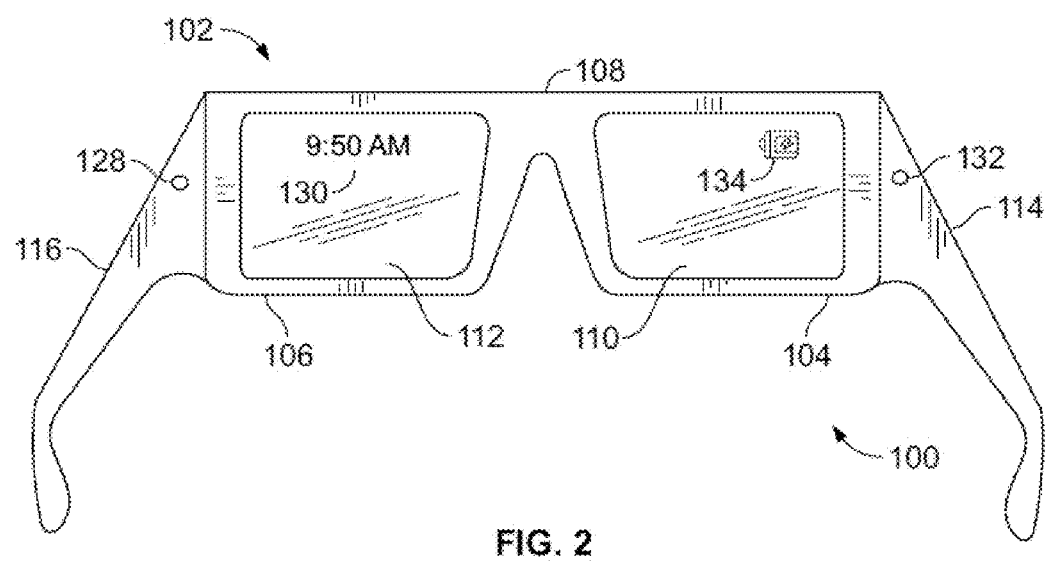
FIG. 2 shows an alternate view of the system of FIG. 1.

FIG. 2 illustrates an alternate view of the system 100 illustrated in FIG. 1. As shown in FIG. 2, the lens elements 110, 112 may act as display elements. The head-mounted device 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110, 112 may act as a combiner in a light projection system and may include a coating that reflects the light projected onto them from the projectors 128, 132. In some embodiments, a reflective coating may not be used (e.g., when the projectors 128, 132 are scanning laser devices).

In alternative embodiments, other types of display elements may also be used. For example, the lens elements 110, 112 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 104, 106 for driving such a matrix display. Alternatively or additionally, a laser or LED source and scanning system could be used to draw a raster display directly onto the retina of one or more of the user's eyes. Other possibilities exist as well.

Figure 3A:
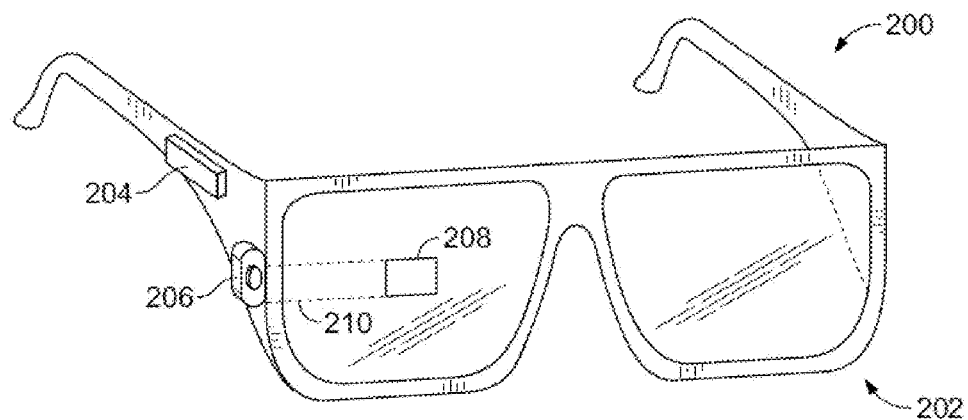
FIG. 3A shows an example system for receiving, transmitting, and displaying data.

FIG. 3A illustrates an example system 200 for receiving, transmitting, and displaying data. The system 200 is shown in the form of a wearable computing device 202. The wearable computing device 202 may include frame elements and side-arms such as those described with respect to FIGS. 1 and 2. The wearable computing device 202 may additionally include an on-board computing system 204 and a video camera 206, such as those described with respect to FIGS. 1 and 2. The video camera 206 is shown mounted on a frame of the wearable computing device 202; however, the video camera 206 may be mounted at other positions as well.

As shown in FIG. 3A, the wearable computing device 202 may include a single display 208 which may be coupled to the device. The display 208 may be formed on one of the lens elements of the wearable computing device 202, such as a lens element described with respect to FIGS. 1 and 2, and may be configured to overlay computer-generated graphics in the user's view of the physical world. The display 208 is shown to be provided in a center of a lens of the wearable computing device 202, however, the display 208 may be provided in other positions. The display 208 is controllable via the computing system 204 that is coupled to the display 208 via an optical waveguide 210.

Figure 3B:
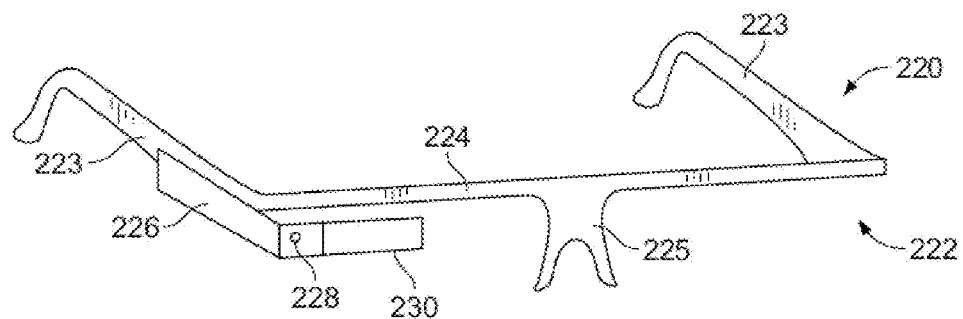
FIG. 3B shows an example system for receiving, transmitting, and displaying data.

FIG. 3B illustrates an example system 220 for receiving, transmitting, and displaying data. The system 220 is shown in the form of a wearable computing device 222. The wearable computing device 222 may include side-arms 223, a center frame support 224, and a bridge portion with nosepiece 225. In the example shown in FIG. 3B, the center frame support 224 connects the side-arms 223. The wearable computing device 222 does not include lens-frames containing lens elements. The wearable computing device 222 may additionally include an onboard computing system 226 and a video camera 228, such as those described with respect to FIGS. 1 and 2.

The wearable computing device 222 may include a single lens element 230 that may be coupled to one of the side-arms 223 or the center frame support 224. The lens element 230 may include a display such as the display described with reference to FIGS. 1 and 2, and may be configured to overlay computer-generated graphics upon the user's view of the physical world. In one example, the single lens element 230 may be coupled to the inner side (i.e., the side exposed to a portion of a user's head when worn by the user) of the extending side-arm 223. The single lens element 230 may be positioned in front of or proximate to a user's eye when the wearable computing device 222 is worn by a user. For example, the single lens element 230 may be positioned below the center frame support 224, as shown in FIG. 3B.

Figure 4:
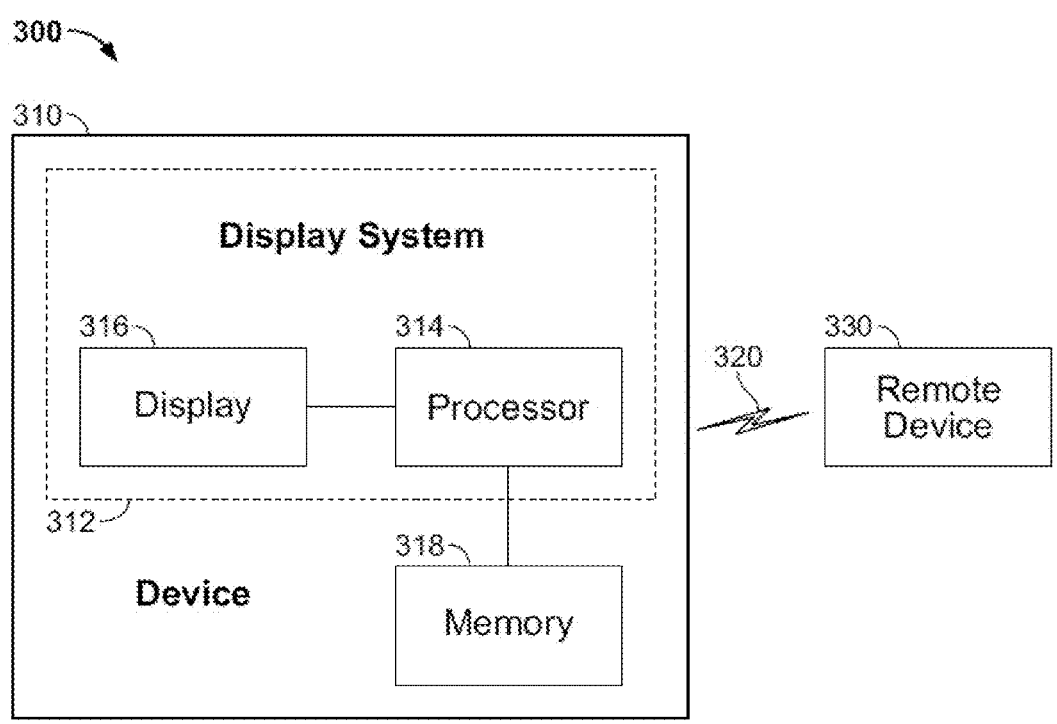
FIG. 4 shows an example system for receiving, transmitting, and displaying data.

FIG. 4 illustrates a schematic drawing of an example computer network infrastructure. In system 300, a device 310 communicates using a communication link 320 (e.g., a wired or wireless connection) to a remote device 330. The device 310 may be any type of device that can receive data and display information corresponding to or associated with the data. For example, 10 the device 310 may be a heads-up display system, such as the head-mounted device 102, 200, or 220 described with reference to FIGS. 1-3B.

Thus, the device 310 may include a display system 312 comprising a processor 314 and a display 316. The display 310 may be, for example, an optical see-through display, an optical see-around display, or a video see-through display. The processor 314 may receive data from the remote device 330, and configure the data for display on the display 316. The processor 314 may be any type of processor, such as a micro-processor or a digital signal processor, for example.

The device 310 may further include on-board data storage, such as memory 318 coupled to the processor 314. The memory 318 may store software that can be accessed and executed by the processor 314, for example.

The remote device 330 may be any type of computing device or transmitter including a laptop computer, a mobile telephone, or tablet computing device, etc., that is configured to transmit data to the device 310. The remote device 330 and the device 310 may contain hardware to enable the communication link 320, such as processors, transmitters, receivers, antennas, etc.

In FIG. 4, the communication link 320 is illustrated as a wireless connection; however, wired connections may also be used. For example, the communication link 320 may be a wired serial bus such as a universal serial bus or a parallel bus. A wired connection may be a proprietary connection as well. The communication link 320 may also be a wireless connection using, e.g., Bluetooth® radio technology, communication protocols described in IEEE 802.11 (including any IEEE 802.11 revisions), Cellular technology (such as GSM, CDMA, UMTS, EVDO, WiMAX, or LTE), or Zigbee® technology, among other possibilities. The remote device 330 may be accessible via the Internet and may include a computing cluster associated with a particular web service (e.g., social-networking, photo sharing, address book, etc.).

Figure 5A:
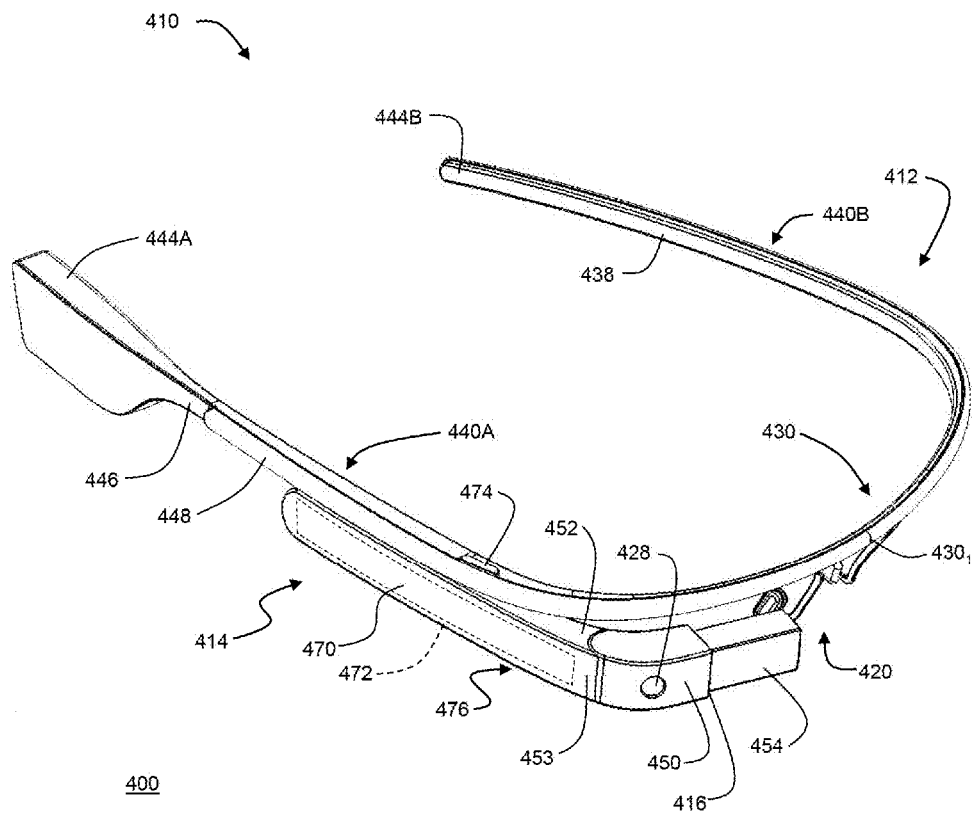
FIGS. 5A and 5B show a wearable computer device according to an embodiment of the disclosure.
Figure 5B:
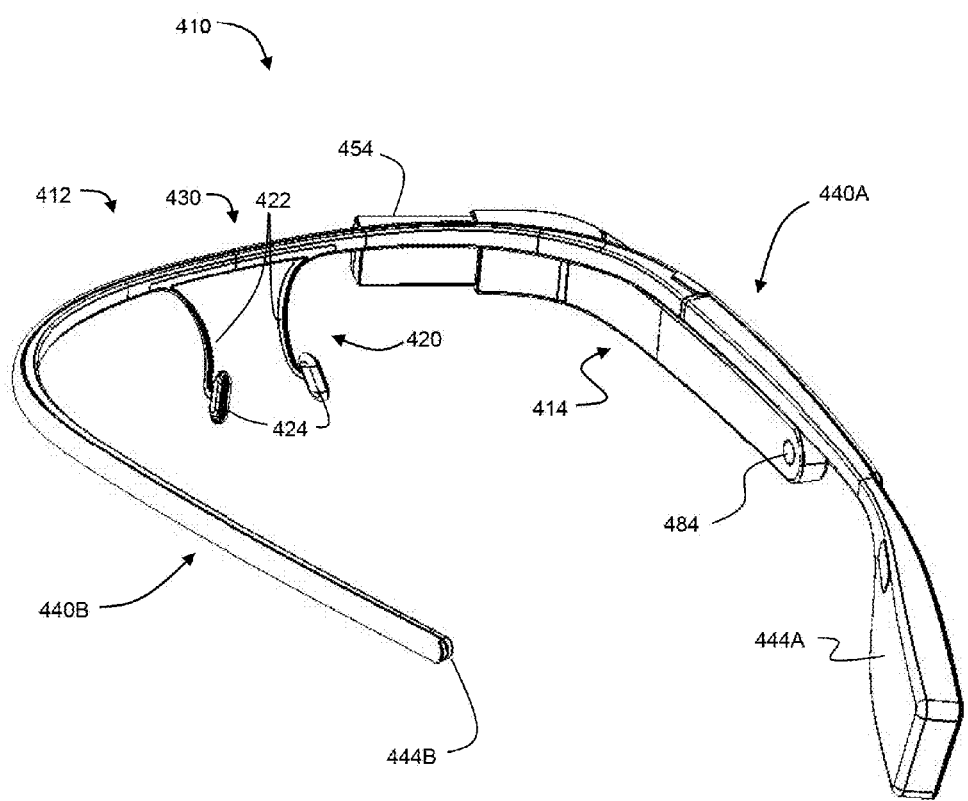
Figure 6:
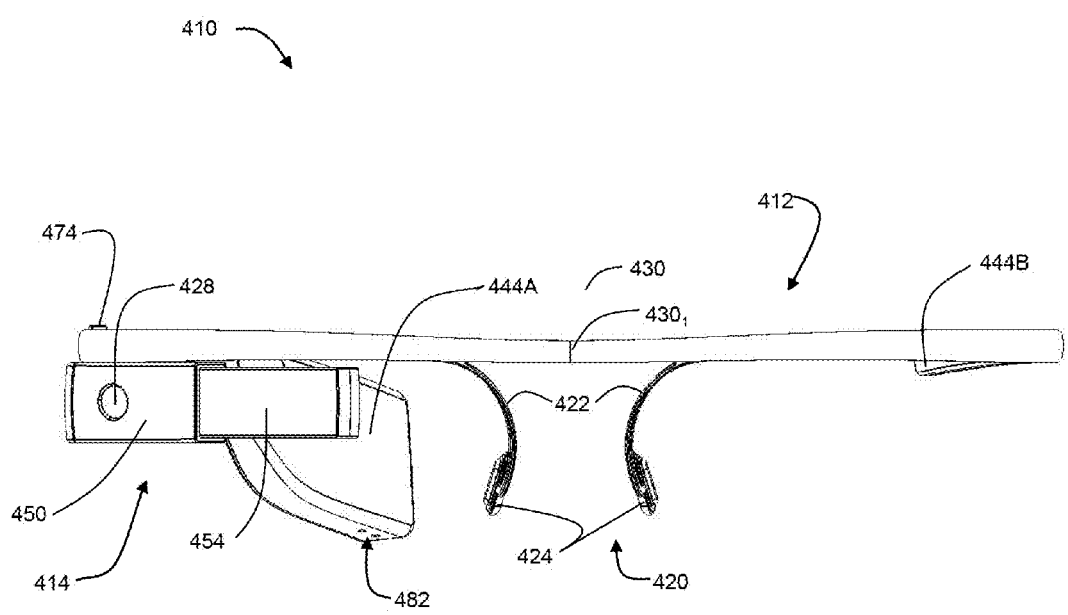
FIG. 6 shows a front elevation view of the device of FIG. 5.

FIGS. 5A, 5B and 6 illustrate an example system 400 for receiving, transmitting, and displaying data according to aspects of the disclosure. The system 400 is a wearable computing device and includes many of the same components included in the configurations described above. The device 410 shown in FIG. 5 is configured to be wearable on the head of the user. As will be described in greater detail below, device 410 includes a band 412 that provides a desired fit of device 410 on a user's head. Device 410 further includes an extension arm 414 that extends from a portion of band 412 to a display end 416 thereof that includes a display element 454. Extension arm 414 is configured such that, when device 410 is worn by a user, display 454 mounted on extension arm 414 can be positioned adjacent the user's eye, within the user's line of sight of at least that eye, for making an image presented thereon viewable by the user. In this manner, the extension arm 414 is configured to carry out at least one operation of the device 410, namely presenting an image to the user. Additional operations can also be carried out through extension arm 414, which can also include an input device in the form of a touch-based input 470 that is accessible to the user to execute a touch input gesture to execute a control function of the device assembly 410 or a function of another electronic device that is connected or in communication with device assembly 410.

Band 412 is shown in FIG. 5 as including a central portion 430 with side arms 440A,440B extending away from opposite sides of the central portion 430. Central portion 430 includes nosepiece 420 configured to rest on the nose of a wearer with the central portion 430 providing a central support for side arms 440A,440B, which can extend unitarily therefrom, or can at least appear to extend unitarily therefrom, with an area of transition between the central portion 430 and the side arms 440A,440B including a bend or curve therebetween. Nosebridge 420 can include a pair of bridge arms 422 that extend from the central portion 430. In the view of the embodiment of device assembly 410 shown in FIGS. 5 and 6, bridge arms 422 extend in a downward direction from central portion 430. As in other figures, the orientation of device assembly 410 shown in FIG. 5 generally corresponds to the orientation of device 410 when being worn by a user when the user's head is in a neutral, upright position. The description of bridge arms 422 extending downward from central portion 430 is made in such a reference frame and is done for purposes of the present description. Discussion of any other relative reference directions is also made for similar purposes and none are intended to be limiting with respect to the present disclosure, unless explicitly stated.

Bridge arms 422 can include respective pads 424 thereon, which can be positioned to rest on parts of the nose of the wearer. Pads 424 can be made of a material that is softer than arms 422 for purposes of comfort. Additionally, the material that pads 424 are made from can be flexible or have a texture that prevents slippage along the surface of the user's nose. Bridge arms 422 can be flexible to further provide a comfortable fit and or grip on the user's nose. Further, bridge arms 422 can be bendable and repositionable so that the position of pads 424 can be changed to best fit the user. This can include movement closer together or farther apart or fore and aft relative to central portion 430, which can adjust the height of central portion 430 and, accordingly, the position of extension arm 414 and its display 454 relative to the user's eye.

Further adjustment of display and other structures thereof can be similar to those in the embodiments described above, as can the structures used to affix extension arm 414 to band 412. In other embodiments, structures similar to arms and pads can be integrally formed with central portion 430 and can be structured such that larger or smaller areas of the nosebridge 420 contact the nose of the user, compared to the embodiment shown. Accordingly, device 410 can be worn on a user's head such that nosepiece 420 can rest on the user's nose with side arms 440A,440B extending over respective temples of the user and over adjacent ears. The device 420 can be configured, such as by adjustment of bridge arms 422 or other adjustments discussed below, such that display element 454 is appropriately positioned in view of one of the user's eyes. In one position, device 410 can be positioned on the user's head, with bridge arms 422 being adjusted to position display 454 in a location within the user's field of view, but such that the user must direct her eyes upward to fully view the image on the display.

Figure 9:
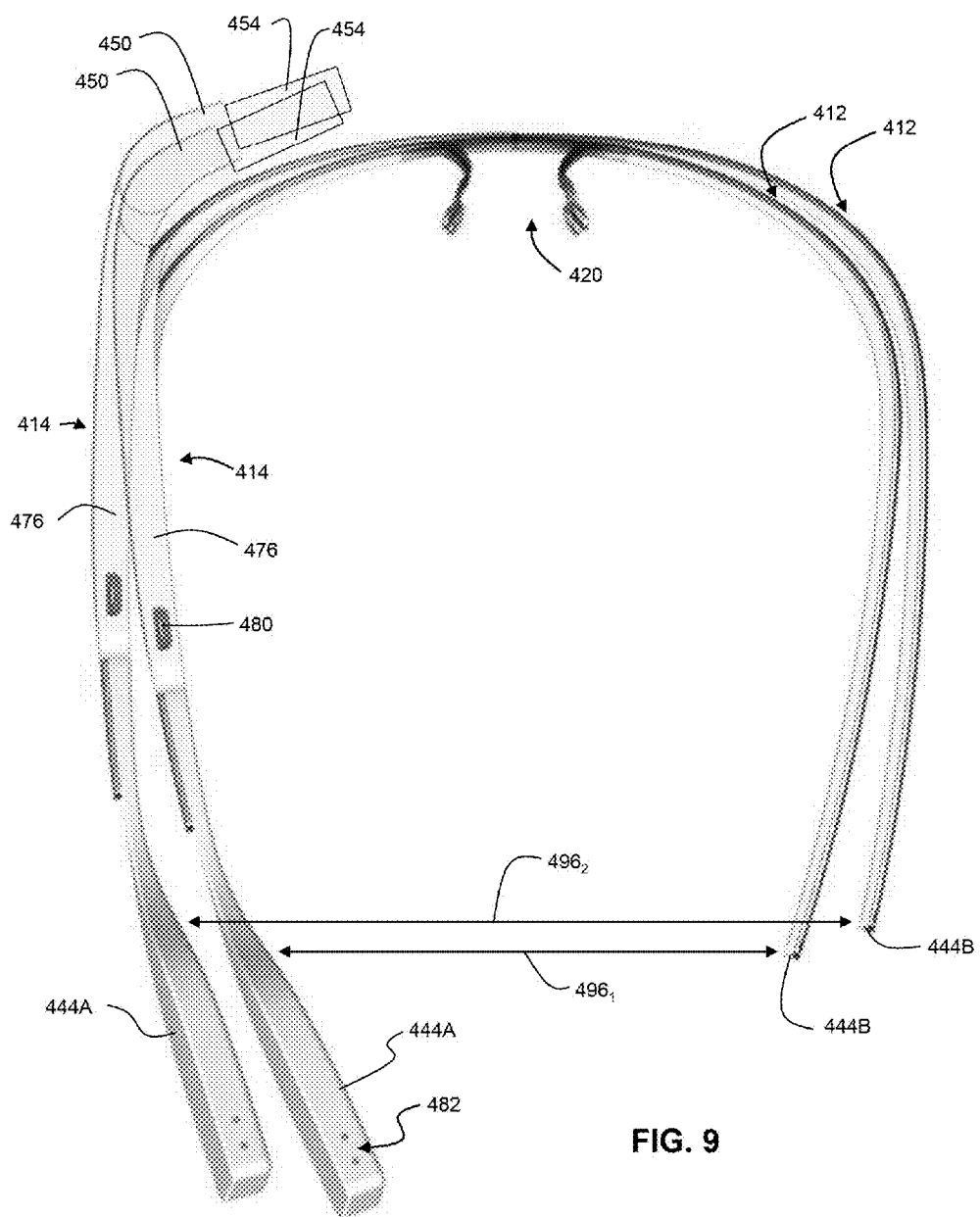
FIG. 9 shows the device of FIG. 5 during various stages of adjustment of another portion thereof.

Side arms 440A,440B can be configured to contact the head of the user along respective temples or in the area of respective ears of the user. Side arms 440A,440B include respective free ends 444 opposite central portion 430. Free ends 444 can be positioned to be located near the ear of a user when wearing device 410. As shown in FIGS. 5 and 9, the center portion 430 and side arms 440A,440B may generally have a "U" shape. In this example, the U shape is asymmetric. The asymmetry is due, in part, to the different configurations of the free ends 444A,444B of the side arms 440A,440B. As shown, free end 444A may be enlarged to house circuitry and/or a power supply (e.g., removable or rechargeable battery) for the system 400. The configurations of the two free ends may be switched so that free end 444B houses circuitry and/or power supply equipment.

Enlarged free end 444A can be configured and positioned to provide a balancing weight to that of extension arm 414. Extension arm 414 is positioned forward of the user's ear, which can cause a portion of its weight to be supported over the brow of the user. By adding weight behind the user's ear (or shifting weight to behind the user's ear) in the form of earpiece 446, the ear becomes a fulcrum about which the weight of extension arm 414 is balanced against that of the earpiece 446. This can remove some of the weight on the user's nose, giving a more comfortable, and a potentially more secure fit with reduced potential slipping of nosepiece 420 downward on the user's nose. The components within enlarged free end 444A, such as a battery or various control circuitry can be arranged to contribute to a desired weight distribution for device 410. For example, heavier components, such as a battery, can be placed toward or away from extension arm 414 on side arm 440A to adjust the weight distribution. In an embodiment, a majority of the weight can be carried by the ear of the user, but some weight can still be carried by the nose in order to give the device a secure feel and to keep the central portion 430 in a desired position over the brow to maintain a desired position for display 454. In an embodiment, between 55% and 90% of the weight of device assembly 410 can be carried by the user's ear.

Band 412 can be configured to resiliently deform through a sufficient range and under an appropriate amount of force to provide a secure fit on user's heads of various sizes. In an example, band 412 is configured to comfortably and securely fit on at least about 90% of adult human heads. To accomplish this, as illustrated in FIG. 9, band 412 can be structured to elastically deform (or resiliently deform) such that the distance 496 between free ends 444A and 444B can increase under force from an initial, or unflexed distance $496_1$ by at least 40% and up to about 50% to a flexed distance $496_2$. In other examples, distance $496_1$ can increase by more than 50%. The original distance $496_1$ between free ends 444A and 444B can be configured to be undersized relative to the smallest head size that band 412 is intended to be worn on such that distance 496 will increase at last somewhat (for example, by about 5%) so that the flexing of free ends 444A and 444B away from each other when worn even by users having small head sizes causes some pressure to be applied to the sides of the user's head.

Additionally, band 412 can be structured, such as by configuration thereof to a sufficient spring coefficient, such that when band 412 is expanded to fit a user of a relatively large head size, the pressure applied to the sides of the user's head by band 412 is not too great so as to cause pain while being worn or to make device 410 difficult to don or doff. Different materials having certain characteristics can be used in different forms to give the desired flex characteristics of band 412. In one example band 412 can have a spring coefficient for expansion, as described above, of between about 0.005 and 0.02 N/mm or, in another example, of about ¹⁄₁₀₀ N/mm. Given an exemplary spring coefficient, a band 412, as described above can expand from an initial distance $496_1$ of about 156 mm to about 216 mm by a force of between about 0.3 N and 1.2 N. In another example, such expansion can be under a force of about 0.6 N.

Band 412 can be configured to include a compliant inner portion 438 and a resilient outer portion 448. Inner portion 438 can include any portions of the band 412 that are intended to contact the user's head. In the particular embodiment shown, inner portion 438 can define the entire inner surface 439 of band 412 to ensure that the compliant material of inner portion makes contact with the user's head regardless of the area of band 412 along which contact is made with the user's head. Inner portion 438 can be made of any material that can provide a degree of compliance to enhance the comfort of the fit of band 412 on the user's head while being able to retain its general shape. Acceptable materials include various foams, such as foam rubber, neoprene, natural or synthetic leather, and various fabrics. In an embodiment, inner portion 430 is made of an injection-molded or cast TPE. Inner portion 430 can also be made from various types of Nylon, including for example, a polyamide nylon such as Grilamid TR90. The compliance of the material of inner portion 430 can be measured by the durometer of the material. In an example, inner portion 438 can be made from a TPE having a durometer of between 30 and 70. Inner portion 438 can also be formed having a hollow passage therethrough or a channel formed therein opposite inner surface 439. Such a passage or channel can be used to route any wiring associated with extension arm 414. For example, as discussed above a battery can be housed in enlarged free end 444A of band 412 that can be connected with the internal components of extension arm 414 to provide power therefor. This connection can be made by wired routed through a channel or hollow passage through inner portion 438.

Outer portion 448 of band 412 can be made of a resiliently flexible material such as metal or plastic. In general, the nature of such a material should be such that outer portion 448 can maintain the desired shape for band 412 while allowing flexibility so that band 412 can expand to fit on a user's head while applying a comfortable pressure thereto to help retain band 412 on the user's head. Outer portion 448 can be elastically deformable up to a sufficiently high threshold that the shape of band 412 will not be permanently deformed simply by being worn by a user with a large head. Acceptable materials for outer portion 448 include metals such as aluminum, nickel, titanium (including grade 5 titanium), various steels (including spring steel, stainless steel or the like), or alloys including these and other metals. In another example, the outer portion 448, or the inner portion 438, may be formed of composite materials, such as carbon fiber reinforced polymer (CFRP). The thickness of outer portion 448 can be adjusted, depending on the material used, to give the desired flexibility characteristics. In an example, the desired fit and flexibility characteristics for band 412, discussed above, can be achieved using grade 5 titanium at a thickness of between about 0.8 mm and 1.8 mm for outer portion 448.

Inner portion 438 can have a profile such that it at least partially fits within a channel formed by outer portion 448. In an example inner portion 438 can be sized to fit within a channel formed by a generally U-shaped cross-sectional profile of outer portion 548. Such a channel can be configured to also accept any wiring of band 412 therein or to close a partially open channel formed in inner portion 439 to hold such wiring.

As shown in FIG. 5, side arm 440A can include an arched or curved section, such that it bends along a portion of the back of the user's ear. As with eyeglasses, the particular shape of such a bend can vary in many ways including in the size of the bend, the distance around the ear which it extends and the amount of contact, if any, actually maintained with the outside of the ear. The bend 446 in side arm 440A can blend into a continuing shape formed in the enlarged free end 444A and can be configured such that the enlarged free end 444A can be positioned in contact with a portion of the user's head behind the adjacent ear. The bend 446 can further be resiliently deformable such that different sizes and shapes of head can be accommodated by such a fit. In such an embodiment, the enlarged free end 444A can be integrally formed with inner portion 438 and can include internal support within a portion thereof that extends beyond outer portion 448. Such internal support can include an internal electronics housing that can contain batteries or electronic circuitry associated with device 410. The internal support can also include resilient members such as spring elements (not shown) to help provide flexion of band 412 and retention pressure against a wearer's head. Such spring elements can also be plastically deformable to allow for user adjustment of the position of enlarged free end 444A. Lengths of armature wire can be used to provide such characteristics. Any internal support within enlarged free end 444A can extend into the area of inner portion 438 that is within outer portion 448 to provide additional support therefor.

Extension arm 414 includes a first portion 476 that extends downward from band 412 at a first portion 476 that can be shaped to also extend along a length of band, such as along side arm 440A. First portion 476 is further shaped to extend away from band 412 to an elbow portion 450 connected with first portion 476 by a joint 456. Elbow portion 450 supports display 454 at an angle relative to arm 476 that can be adjusted by rotation of elbow portion 450 about joint 456. In the example shown in FIG. 5, first portion 476 of extension arm 414 can be slightly curved so as to extend along a similarly curved portion of side arm 440A. Such a curve can continue on extension arm as band 412 curves inward as side arm 440A transitions to central portion 430. Extension arm 414 can be positioned vertically below band 412 such that band 412 can remain out of the user's line of sight while display 454 is visible to the user.

Figure 10:
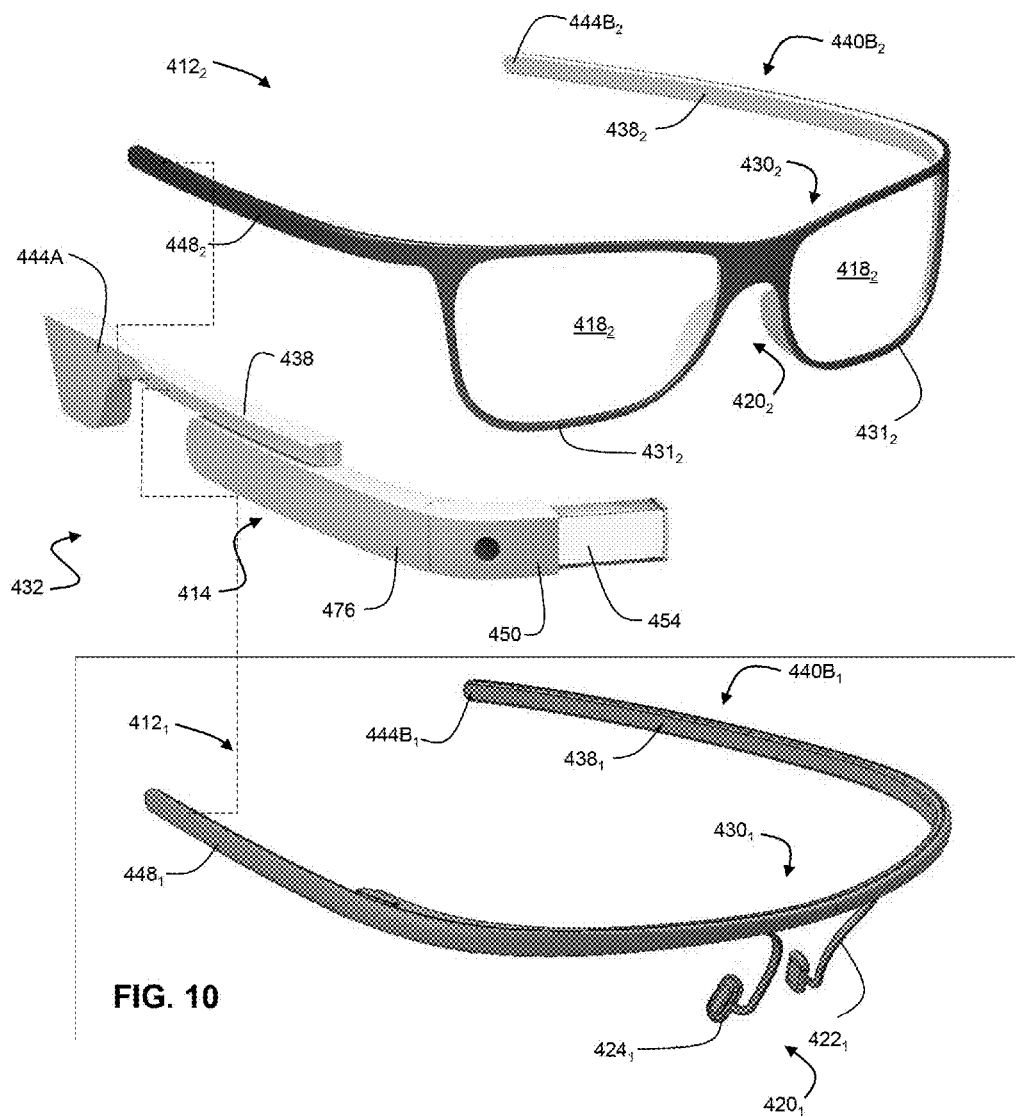
FIG. 10 shows an exploded view of the device of FIG. 5 according to a modular configuration thereof.

While device 410 can be configured to give a visual appearance that band 412 and extension arm 414 are distinct units, the extension arm 414 can be formed as a part of at least a portion of band 412. For example, in a band arrangement, described above, where band 412 includes an inner portion 438 and an outer portion 448, a portion of the extension arm housing 452 can be integrally formed with inner portion 438, as shown in FIG. 10. In such an example, internal components of extension arm 414, such as a circuit board, logic board, or the like can extend into inner portion 438, as can an associated portion of housing 452.

In another example, the housing 452 of extension arm 414 can be connected with a housing unit internal to enlarged free end 444A, such as by an internal member. The internal member may be connected between the two such as using fixation elements, adhesive or integral forming. The housing 452, internal housing unit, and connection can then be overmolded with another material, such as TPE or the like to give a substantially uniform appearance and to form the visible portions of the inner portion 438 of band 412. Visual features, such as parting lines, relief lines, or the like can be included in the shape of such a unit 432 to give the visual appearance of separate elements, if desired.

In an embodiment where band 412 is integrally formed with or otherwise connected with generally rigid extension arm 414 along a portion thereof, band 412, while made to be flexible, may be made rigid where attached with extension arm 414. In the example shown, this may occur along a portion of side arm 440A. In such an example, it may be desired to form band 412 such that the flexation thereof, described generally above, occurs mostly within central portion 430 or in the areas of transition between central portion 430 and side arms 440A,440B.

Such a configuration can be achieved in a number of ways. For example, side arm 440A is made more rigid by connection with rigid extension arm 414. In such an embodiment it may be desirable to make side arm 440B rigid as well so that the side arms 440A and 440B give a more similar feel along the user's head. This can be done by assembling a structural member, such as a rigid piece of wire or the like inside of inside portion 538. Further, outside portion 448 can be structured to make side arms 440A and 440B more rigid. For example, outside portion 448 can have a U-shaped cross-sectional profile with walls 480 that extend inward relative to outside wall 459. Walls 480 can be present along side arms 440A and 440B and can be either absent from central portion 430 or can extend inward by a lesser amount to make central portion 430 less rigid. Further, as shown in FIG. 6, band 412, including outside portion 448, can taper such that outside wall 459 is narrower toward the middle of central portion 430. Additionally, the material thickness of outside portion 448 can be less along portions of central portion 430 of band 412 to make central portion relatively more flexible.

Display 454, which is elongated and generally defines a display axis, can extend relative to first portion 476 at an angle that can be adjusted within a range, for example, from about 100° to about 125° by rotation of elbow portion 450 relative to first portion 476 about joint 456. Although the shape of first portion 476 is shown in the figures as having a curved shape in the direction in which such an angle is measured, such a measurement can be taken with respect to a line tangent to any portion of first portion, such as along the end thereof toward joint 456. In another example, the adjustment angle of display 454 can be within a range of about 20° or within a range of 16° or less, with the middle position of such a range positioned between about 195° and 115° relative to first portion 476 of extension arm 414. Joint 456 is positioned in extension arm 414 such that it can rotate along a substantially vertical axis when being worn by a user. In other words, in the embodiment shown, band 412 is formed in a U-shape that generally defines a plane. Such a plane can be considered an approximation, allowing for any curves in band 412 that are vertically displaced relative to the rest of band 412. Joint 456 can be configured such that elbow portion 450 can rotate along another substantially parallel plane or along the same plane.

Figure 7:
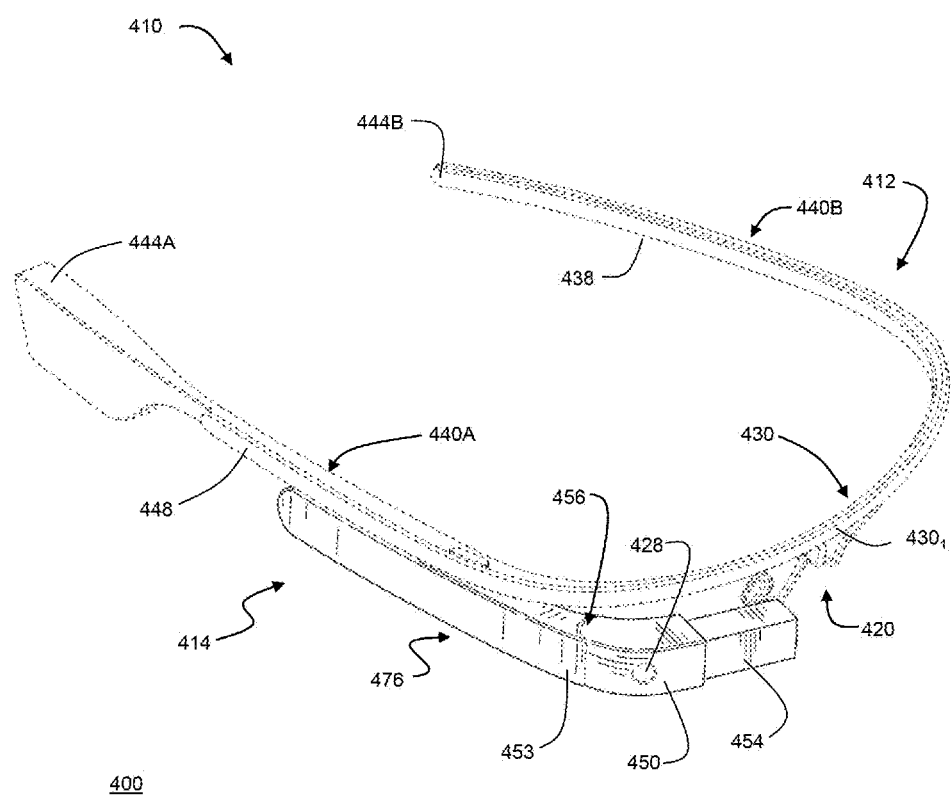
FIG. 7 shows the device of FIG. 5 in an adjusted configuration thereof.
Figure 8:
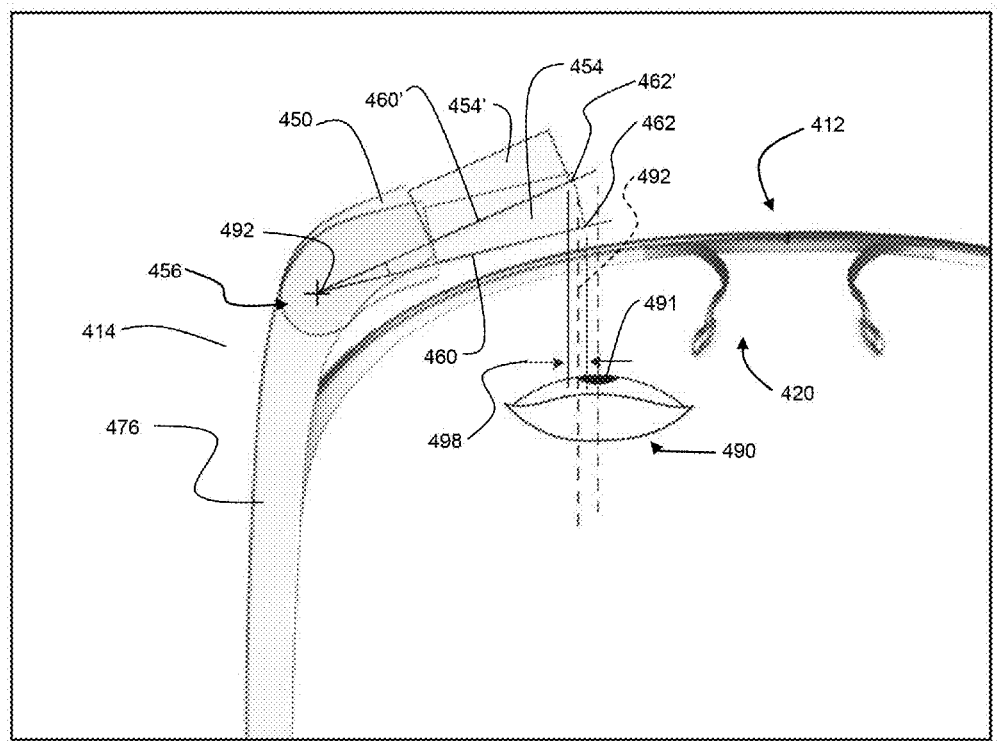
FIG. 8 shows the device of FIG. 5 in various stages of adjustment of a portion thereof.

As shown in FIGS. 7 and 8, such adjustment can be used to position display 454 such that an image presented thereon can be comfortably viewed by a wearer of device 410. As shown, rotation of elbow portion 450 about axis 492, can cause surface 460 to move closer to or farther from the user's eye 490. This can allow the user to adjust the display 454 for comfortable viewing of an image presented thereon and can allow the user to position display 454 at a distance such that display 454 does not contact the user's brow or eyelashes, for example. Further, in some forms of display 454 and in certain applications, it may be desired to allow the user to adjust the lateral position of display 454 such that the inside edge 462 of surface 460 is positioned outside of the user's pupil 491 when the user's eye is in a neutral (or forward looking) position.

As shown in FIG. 8, when device 410 is being worn, display 454' may be positioned such that it at least partially extends beyond an outside edge (indicated by line 494) of the wearer's pupil 491. The joint 456 can allow the user to rotate elbow portion 450 such that display 454, while moving outward away from eye 490, also moves along a lateral directional component by a distance 498 such that edge 462 moves to a position outside of the user's pupil when the user's eye 490 is in the neutral position shown in FIG. 8.

Additionally, the adjustment between elbow portion 450 and first portion 476 can compensate for movement of first portion 476 relative to central portion 430 or nosepiece 420 due to flexing of band 412 with which first portion 476 is joined. As shown in FIG. 9, when band 412 flexes such that distance 496 between free ends 444A and 444B increases, side arms 440A and 44B can rotate and translate relative to their positions when band 412 is unflexed. This, accordingly causes the same rotation and translation of first portion 476 of extension arm 414. Such movement causes a corresponding rotation and translation of elbow portion 450 and display 454, depending on the shape of extension arm 414. In the example shown, display 454 is moved inward toward center $430_1$ of band 412 and away from the user's eye. Other configurations of band 412 and/or extension arm 414 are possible in which display moves closer to the central portion 430, and thus closer to the user's eye.

The rotation and translation of display 454 from flexing of band 412 can cause display 454 to move into a disadvantageous position, such as too close to the user's eye or in which edge 462 is aligned with or positioned inward of the user's pupil 490, as discussed above. In such instances, elbow portion 450 can be rotated about joint 456 to counter the movement caused by the flexing of band 412 and to move display 454 into a more advantageous position.

Figure 11:
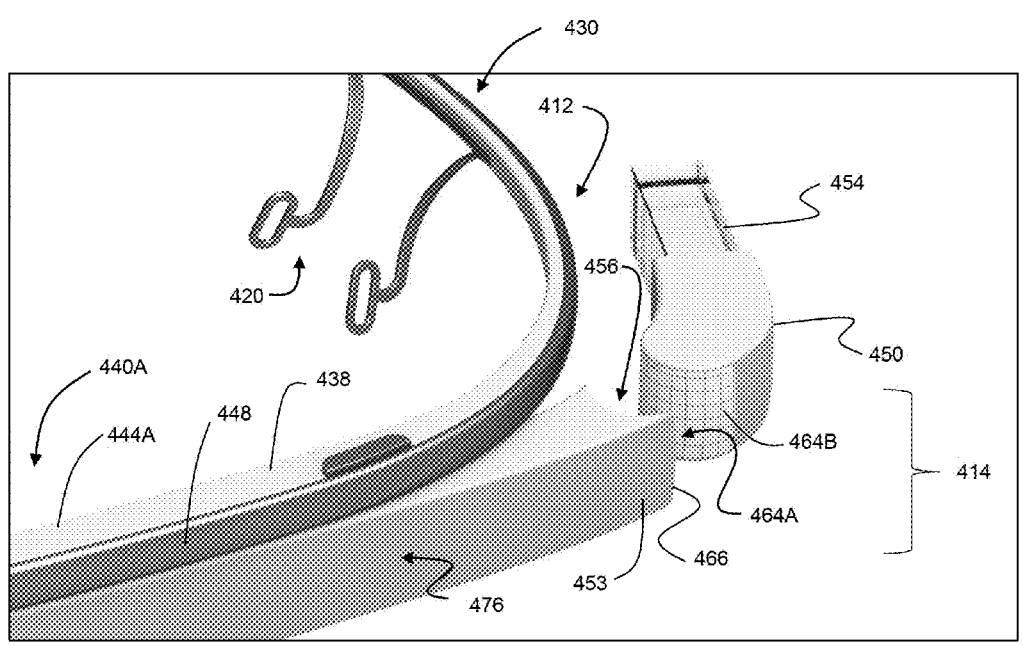
FIG. 11 shows a portion of the device of FIG. 5.

The joint 456 between first portion 476 and elbow portion 450 can include an internal hinge of sufficient friction to maintain a position in which elbow portion 450 is placed relative to first portion 476. First portion 476 and elbow portion 450 can be configured to give a uniform appearance, as shown in the figures. First portion 476 and elbow portion 450 can be further configured so that the appearance of a constant curvature of the outer surface 475 of extension arm 414 regardless of the position of joint 456. Further, as shown in FIG. 11, an articulating surface 464A of first portion 476 can define a leading edge 466 with outer surface 453. Articulating surface 464A can be configured to intersect with outer surface 475 such that the leading edge 466 gives the appearance of a smooth curve that has an apex thereof that overlaps elbow portion 450 more than at the outer edges thereof. Such a configuration can give a more visually pleasing and uniform appearance than if the articulating surface were a simple surface of revolution that would form a more wavy intersection with the example compound curved outer surface 475 of extension arm 414. Articulating surface 464B is shown as transitioning from a surface that is convex along two axes adjacent surface 453 to a surface that is convex along one axis and straight along another. Articulating surface 464A can be a negative image of articulating surface 464B, which can facilitate the desired appearance of leading edge 466.

Other structures can be used to achieve lateral translational adjustment for allowing edge 462 to be positioned outside of a user's pupil 491. For example, display 454 can be mounted to first portion 476 of extension arm 414 using a sliding arrangement that can permit the desired lateral translation thereof. This can be achieved by joining second portion 450 of extension arm 414 to first portion 476 using a track or other sliding joint. An additional sliding or telescoping feature can be used to provide movement of display 454 toward and away from the user's eye to provide eye relief. In another arrangement extension arm 414 can be a unitary structure without joint 456 and can be rotatably attached to band 412 to allow rotation in a plane similar to that of the rotation of second portion 450 shown in FIG. 8. Such rotation would, accordingly, also have a lateral component for the desired lateral adjustment of display 454 and edge 462.

In an embodiment, the image source associated with display 454 and its related circuitry can be held within elbow portion 450. Circuitry for a touch-based input 470 can be positioned within first portion 476 such that, when display 454 is positioned over a user's eye, first portion 476 is positioned in a position that extends over the user's temple adjacent that eye.

In the embodiment shown, display 454 is in the form of a generally transparent prism that is configured to overlay or combine with the user's sight an image generated by electronic display components that are positioned within the housing 452. Such a prism can be structured to receive a projected image in a receiving side 458 and to make that image visible to a user by looking into a viewing side 460 of display 454. This can be done by configuring display 454 with a specific shape and or material characteristics. In the example shown, the receiving side 458 of display 454 is adjacent to or within housing 452 such that the electronic components inside housing 452 can contain a video projector structured to project the desired video image into receiving side 458 of prism 454. Such projectors can include an image source such as LCD, CRT, and OLED displays and a lens, if needed, for focusing the image on an appropriate area of prism 454. The electronic components associated with display 454 can also include control circuitry for causing the projector to generate the desired image based on a video signal received thereby. Other types of displays and image sources are discussed above and can also be incorporated into extension arm 414. Further, a display can be in the form of a video screen consisting of, for example, a transparent substrate. In such an example, the image generating means can be circuitry for a LCD display, a CRT display or the like positioned directly behind the screen such that the overall display is not transparent. The housing of the extension arm 414 can extend behind the display and the image generating means to enclose the image generating means in such an embodiment.

The receiving surface 458 of display 454 structured to combine the projected image with the view of the environment surrounding the wearer of the device. This allows the user to observe both the surrounding environment and the image projected into prism 454. The prism 454 and the display electronics can be configured to present an opaque or semi-transparent image, or combinations thereof, to achieve various desired image combinations.

It is also noted that, although the embodiment of FIG. 5 shows a extension arm 414 that is joined with band 412 such that it is positioned over the right eye of a user when being worn, other similar embodiments are possible in which a mirror-image of extension arm 414 can be attached on an opposite side of band 412 to make it positionable over the left eye of the user. Depending on the application of device 410 or individual user preferences, it may be desirable to position extension arm 414 on a particular side of the user's head. For example, a right-handed person may prefer having the extension arm 414 on the right side of her head to make interaction with touch-based input 470 easier. In another example, a person may prefer to have the display 454 over a dominant eye for easier interaction with elements presented on display 454 or over a non-dominant eye to make it easier to shift his focus away from elements presented on display 454 when engaged in other activities.

As discussed above, an input device in the form of a touch-based input 470 is also desirably included in extension arm 414. Touch-based input 470 can be a touchpad or trackpad-type device configured to sense at least one of a position and a movement of a finger via capacitive sensing, resistance sensing, or a surface acoustic wave process, among other possibilities. Touch-based input 470 can further be capable of sensing finger movement in a direction parallel or planar to a surface thereof, in a direction normal to the surface, or both, and may also be capable of sensing a level of pressure applied. Touch-based input 470 can be formed having an outer layer of one or more insulating, or dielectric, layers that can be opaque, translucent, or transparent and an inner layer of one or more conducting layers that can be opaque, transparent, or translucent.

In an embodiment, the outer layer of the touch-based input 470 can be a portion of an outer wall 453 of housing 452. This can provide a seamless or uniform incorporation of touch-based input 470 into housing 452. The housing can define an interior cavity for containing the inner layer of the touch-based input 470 and any electrical structures, such as control circuitry, associated therewith. The outer layer of the touch-based input 470 can include the entire wall 453 or a selected operable area 472 in the form of one or more touch-surfaces 470 thereof, as dictated by the size, shape, and position of the inner layer of the touch-based input 470. If a portion of the housing is to be used as the outer layer of the touch-based input 470, then the housing 452 can be made of a dielectric material such as plastic. In an alternative embodiment, the touch-based input can be a discrete element that is mounted in an opening in the housing 452 that includes its own dielectric outer layer, separate from wall 453 to define the operable area within a window or opening through wall 453 in a manner similar to a touchpad on a laptop computer.

In the embodiment shown, touch-based input 470 is positioned on first portion 476 and defines a generally vertical plane that overlies a portion of the side of the user's head. Circuitry can be formed or adjusted to function with a curved outer surface, etc. Accordingly, touch-based input 470 may not be visible to a user of the assembly 410, when it is being worn.

Additionally, housing 452 can include additional input structures, such as a button 484 (shown in FIG. 5B) that can provide additional functionality for extension arm 414, including implementing a lock or sleep feature or allowing a user to toggle the power for device 410 between on and off states. The button 484 can further include an LED light beneath a surface thereof that can indicate a status of the device, such as on or off, or asleep or awake. The button can be configured such that the light is visible when on, but that the source of the light cannot be seen when the light is off.

Touch-based input 470, or another type of input, can be used to provide a control function that is executed by extension arm 414, such as by an on-board CPU or a CPU mounted to or within an associated wearable structure, or by a remote device, such as a smartphone or a laptop computer. In an embodiment information related to the control function is viewable by the user on display 454. In one example, the control function is the selection of a menu item. In such an example, a menu with a list of options can be presented on display 454. The user can move a cursor or can scroll through highlighted options by predetermined movement of a finger along touch-based input 470 and can confirm the selection by a different movement, the acceptance of the selection being indicated by the display. Examples of menu item selections can include whether to answer or decline an incoming call on a remotely-linked smartphone or to scroll or zoom-in on a map presented in display.

Additional input structures can be included in extension arm 414. These can include a camera 426, as shown in FIG. 5. The camera can be used to take picture or record a video at the user's discretion. The camera can also be used by the device to obtain an image of the user's view of his or her environment to use in implementing augmented reality functionality. A light sensor can be included in connection with the camera 426, for example, within the same housing feature as camera 426. Such a light sensor can be used by firmware or software associated with the camera 426. As shown in FIG. 5, the camera (and sensor) can be included in a housing 452 positioned within the elbow portion 450 and facing in a direction substantially perpendicular to viewing surface 460 of display 454. In such an arrangement, camera 426 is positioned to face in a direction along the user's line of sight, and the sensor is positioned to sense light within the view of the camera 426.

In an embodiment, button 474 can be configured to receive an input from the user to direct device 410 to capture an image using camera 426 or one of multiple cameras of device 410. In an embodiment, the control circuitry or software within device 410 can allow the user to select one or a plurality of multiple cameras with which to capture an image or "take a picture" before receiving an input using button 474 to actually capture the image using the selected camera. Button 474 can be positioned on extension arm 414 along the top surface 467 of housing 452. Such positioning can allow for the user to grasp housing 452, for example, using the user's thumb positioned opposite from top surface 467, with the user's index finger to press on button 474 in a pinching motion. This action can be similar to the motion used to activate a shutter in a conventional camera (e.g. a point-and-shoot or an SLR camera) or a motion used by people to mimic such a motion, making the use of button 474 to take a picture with camera 474 more intuitive to a user. Additionally, the positioning of button 474 to be pressed in the above-described pinching motion can result in a more stable activation of button 474, wherein the user's thumb provides support for extension arm 414 when button 474 is pressed. Such stability can be further enhanced by configuring button 474 with a low activation pressure such that the force applied thereto is low enough to not cause extension arm 414 to move during image capture. According to another implementation, the button 474 be any type of switch, such as an optical switch, a capacitive-touch switch, a force-sensing resistive switch, or any other type of switch.

As mentioned previously, housing 452 can contain electronic circuitry such as the circuitry for touch based input 470. In addition housing 452 can include control circuitry for the image source associated with display 454, the camera 426, or the sensor 428, or one or more circuit boards including a processor to control display 454, touch based input 470 or to perform other functions for extension arm 414. Housing 452 can further include a power source, such as a battery to power the other circuitry. Additionally housing 452 can include memory, a microprocessor or communications devices, such as cellular, short-range wireless (e.g. Bluetooth), or WiFi circuitry for connection to a remote device. Additionally, any such circuitry can be included in band 414 such as in at least enlarged free end 444A, for example in an internal cavity thereof.

Enlarged free end 444A can also include one or more connection contacts 482 that can be used to connect device 410 to a power source to recharge a battery without removal thereof. Further device 410 can include a connection port 480 that can be used to connect device 410 to an external device such as a smartphone or a computer. Port 480 can be any standardized connection type port such as USB, firewire, thunderbolt, or a specialized port 480. Port 480 can also be configured to connect with a power source to charge a battery within device 410.

As discussed above, in an embodiment of device 410, shown in FIG. 10, extension arm 414 can be included in a unit 432 with a portion of inner portion 438 of band 412 that includes enlarged free end 444A of side arm 440A. In such an embodiment, a removable band $412_1$ can include the remainder of inner portion $438_1$ and the entirety of outer portion $448_1$. When band $412_1$ is assembled with module 432, the resulting structure can be substantially the same as discussed above with respect to FIGS. 1-9. Further, an additional band $412_2$ can be provided that includes an inner portion $438_2$ and an outer portion $448_2$, similar to that of band $412_1$. Band $412_2$, however, can be structured to include a pair of rims $431_2$ integrally formed therewith that can receive respective ones of a pair of lenses $418_2$. The lenses $418_2$ can be in the form of sunglass lenses, prescription eyeglass lenses, prescription sunglass lenses, or the like. Lenses $418_2$ can be captured between portions of outer portion $448_2$ and inner portion $438_2$ within rims $431_2$. Further, inner portion $448_2$ of band $412_2$ can be removable to allow the lenses $418_2$ to be interchanged with band $412_2$. Inner portion $438_2$ can also include a nosepiece $420_2$ integrally formed therewith. In this embodiment, band $412_1$ and band $412_2$ can be interchangeable by a user and can attach to module 432 by a snap-fit arrangement or the like. Module 432 can include a mechanism or other means to identify, for example, when a band $412_2$ including sunglass lenses is assembled therewith to adjust settings of module 432, such as the brightness of display 454.

Figure 12A:
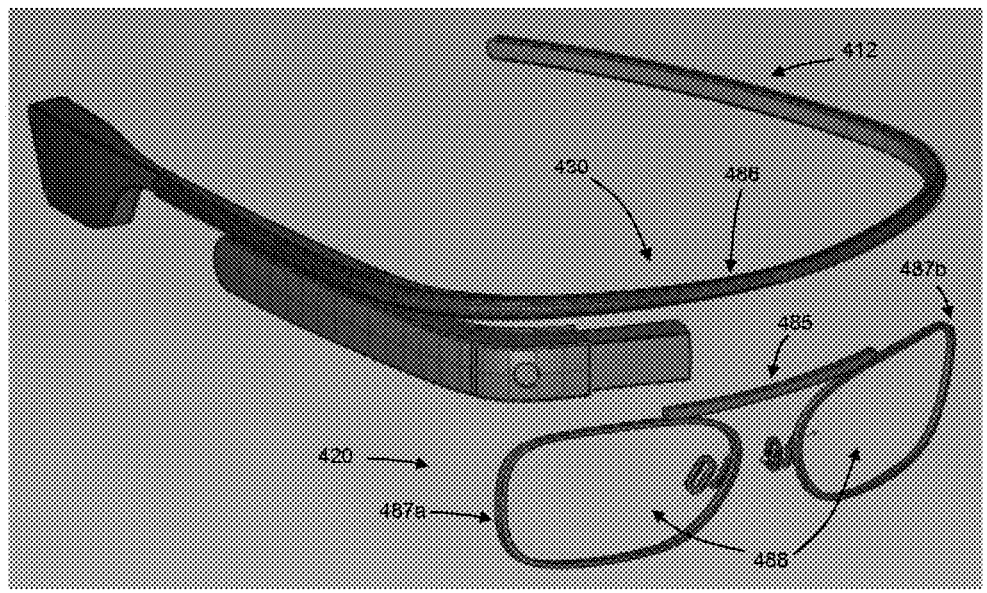
FIGS. 12A and 12B show a wearable computer device according to one aspect of the disclosure.
Figure 12B:
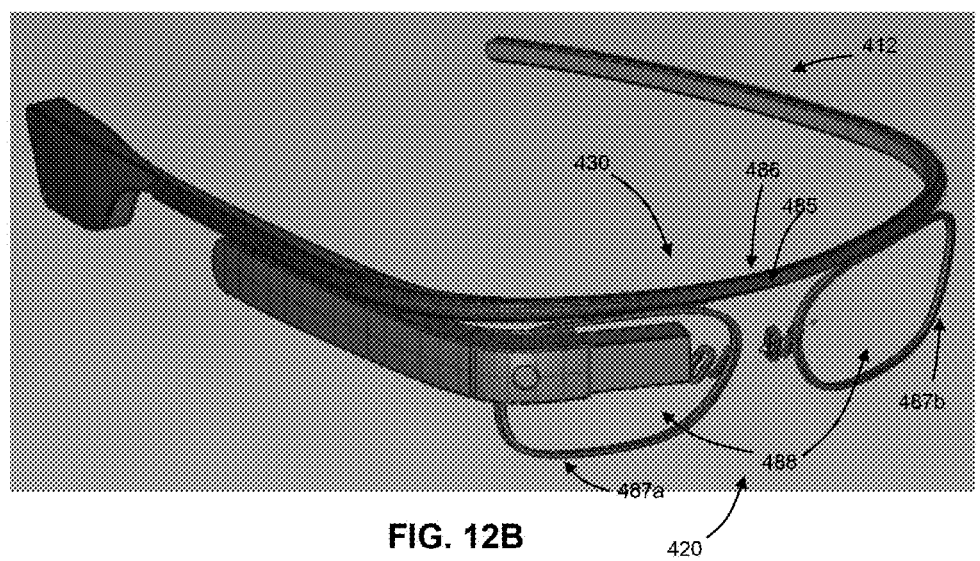

According to another implementation, the nosebridge 420 may be removable from the center portion 430 of the band 412, as illustrated in FIGS. 12A and 12B. FIG. 12A illustrates the nosebridge 420 removed from band 412, while FIG. 12B illustrates the nosebridge 420 coupled with the band 412. In this example, the nosebridge 420 may include a crosspiece 485 which may removably attached to a connection section 486 of the band 412. The connection section 486 may be a cutout portion from the center portion 430, and in one example may have groove, slits, or channels to engage with the crosspiece 485. In another example, the connection section 486 may be a projection from the center portion 430 that may be configured to engage with the crosspiece 485. In yet another example, the connection section 486 may have no visible differences from the remainder of the band 412, but may have an embedded feature, such as a magnet, configured to interact with a corresponding magnet in or on the crosspiece 485.

The nosebridge 420 may also include two frames 487, which may be connected to the crosspiece 485. Nosebridge 420 may further include lenses 488 that correspond to the frames 487. The lenses 488 may be secured within the frames 487 by any method, and in one example may be secured within channels formed in an interior surface of the frames 487. The frames 487 may be integrally formed with the crosspiece 485 such that a user may remove the nosebridge 420, including frames 487, lenses 488, as well as bridge arms 422 and pads 424, by detaching crosspiece 485 from connection section 486. Although nosebridge 420 is depicted as including two frames 487, the lenses 488 may attach directly to the crosspiece 485. In this way, an edge of each lens may be secured to the crosspiece 485 by any method, such as bonding, adhesive, mechanical fasteners such as screws, or the like.

The crosspiece 485 may be attached to and removed from the connection section 486 in different ways, according to various aspects of the disclosure. In one example, the crosspiece 485 can function as a leaf spring. In this case, the user may pinch the ends of the crosspiece 485 inward while sliding them into receptacles of the connection section 486. Removal from the connection section 486 may be done by pulling a center portion of the crosspiece 485 away from the connection section 486 to disengage the ends from the receptacles. In another example, the crosspiece 485 may be secured to the connection section 486 by screws or other types of fasteners. In yet another implementation, each of crosspiece 485 and connection section 486 may have a magnet embedded at least partially therein or formed on a surface thereof. An attractive force between the magnets may be strong enough to secure crosspiece 485 to connection section 486, while allowing for a user to remove nosebridge 420 without requiring excessive manual force.

Figure 13A:
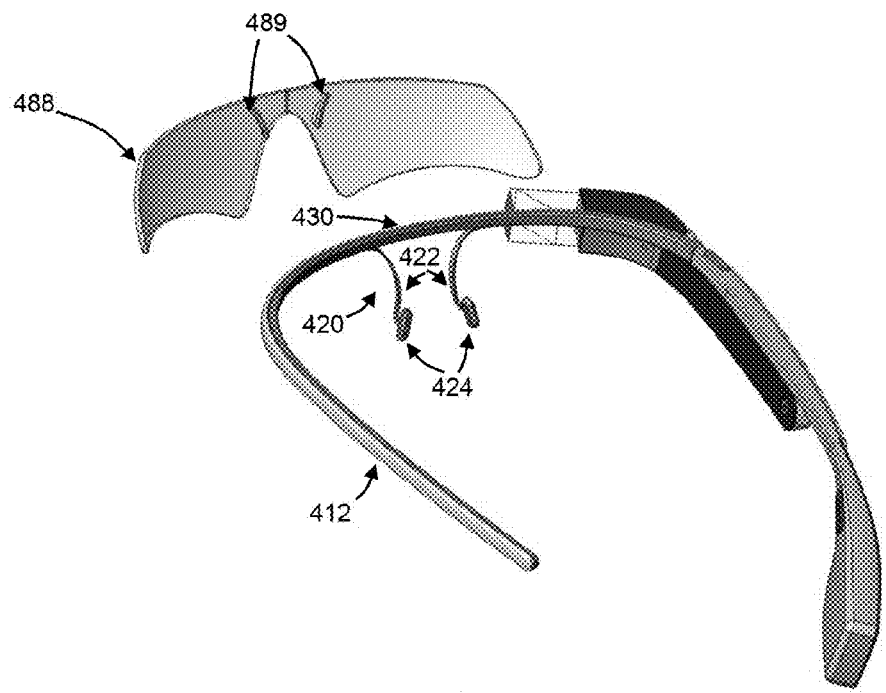
FIGS. 13A-C show a wearable computer device according to one aspect of the disclosure.
Figure 13B:
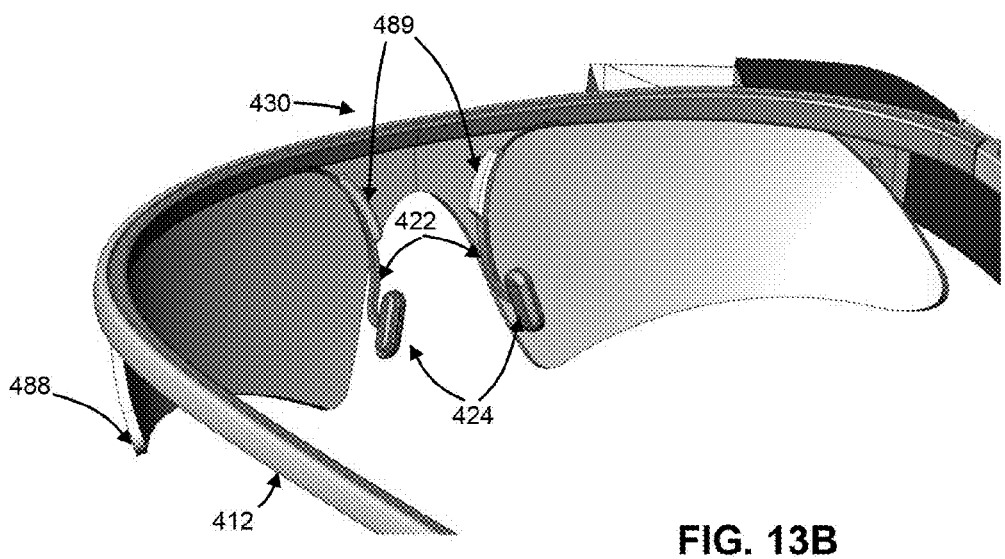
Figure 13C:
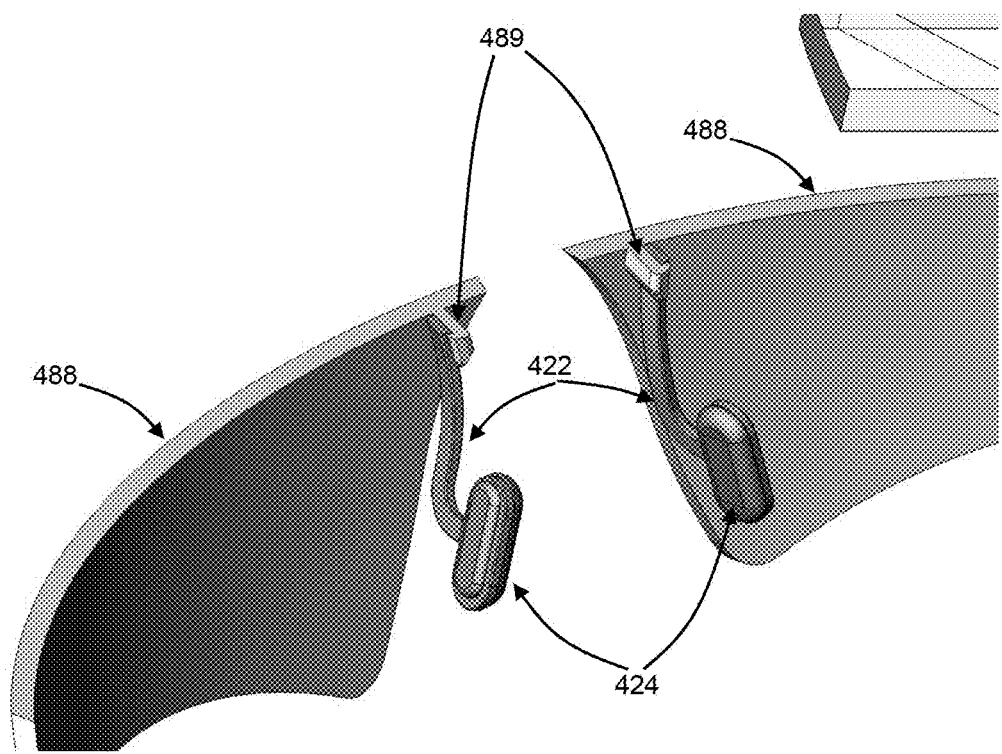

Although nosebridge 420 is depicted as a single unit, it is understood that each of the frames 487 may each include their own crosspiece 485 such that the frames 487 are separately removable from connection section 486. It is also understood that lenses 488 may be any type of lenses suitable for human eyes, such as prescription lenses for any type of eye disease or disorder, such as nearsightedness or farsightedness. Lenses 488 may also be bifocal lenses or reading glasses, or may have a film formed thereon to reduce glare. In another example, lenses 488 may be sunglasses, and may at least partially block forms of electromagnetic radiation from human eyes, such as ultraviolet A or B. In yet another example, lenses 488 may be purely decorative, and may not provide correction to a user's vision. Although a number of lens examples are provided above, it is understood that the lenses 488 may be any other type of lenses, such as athletic lenses to protect a user during athletics, protective lenses that may protect a user from physical or chemical interactions, such as in a wood shop or chemistry laboratory, or may be lenses that have specialized electromagnetic shielding properties, such as to filter out certain types of electromagnetic radiation, including, for example, ultraviolet or infrared radiation. According to another implementation, the nosebridge 420 may be permanently, semi-permanently, or integrally formed with the center portion 430 of the band 412, as illustrated in FIGS. 13A, 13B, and 13C, and lenses 488 may be removably secured to bridge arms 422. Lenses 488 may be removably secured to the band 412 by clips 489. The clips 489 may be formed on any surface of the lenses, and in one example may be formed on a face of the lenses 488 that faces the user's eyes. In another example, the clips 489 may be formed along an edge surface of the lenses 488. According to various aspects of the disclosure, the clips 489 may be removably secured to the bridge arms 422 in various ways. In one example, the clips 489 may be secured at interior portions of bridge arms 422, e.g., between the bridge arms 422. In this way, the bridge arms 422 may exhibit resilient properties, such that the bridge arms 422 may be manipulated slightly in either lateral direction. The bridge arms 422 may be manipulated such that they are moved away from one another, and the clips 489 may slide between the bridge arms 422 in their manipulated position. Upon release of the bridge arms 422, the resilient force of the bridge arms 422 may secure the lenses 488 in place by virtue of the lateral force on the clips 489 or by passing beyond an undercut therein. This arrangement is illustrated in FIG. 13B.

Alternatively, the clips 489 may be secured to exterior portions of bridge arms 422, e.g., portions of each of the bridge arms 422 that face away from the adjacent bridge arm 422. As discussed above, the bridge arms 422 may exhibit a resilient lateral force. In this implementation, the bridge arms 422 may be manipulated toward one another manually, and the clips 489 may be slid over the exterior portions of the bridge arms 422. Upon release of the bridge arms 422, the lateral force between the bridge arms 422 and the clips 489 allow the lenses 488 to be stably secured.

Although lenses 488 are depicted as being unitary, as shown in FIGS. 13A and B, the lenses 488 may be separately formed, as shown in FIG. 13C. In this example, each of the two lenses 488 includes a clip 489. Each of the clips may be securely fastened to a corresponding bridge arm 422 to allow each of the lenses to be secured to the nosebridge 420. In this way, clips 489 may be mechanically fastened to the bridge arms 422 according to various aspects of the disclosure. For example, the clips 489 may have features that correspond to features on the bridge arms 422, allowing the clips to be locked into place with the bridge arms 422. In one example, the bridge arms 422 may have a slot, channel, or angled portion that corresponds to the clips 489. In another example, the clips 489 may be slid over a narrow portion of the bridge arms 422, and moved to a thicker portion of the bridge arms 422 to ensure a secure fit. In addition to the methods of fastening clips 489 to bridge arms 422 describe above, other methods of securing the clips 489 to the bridge arms 422 may be used. For example, hooks, magnetic members, or any other securing mechanism may be used.

Additionally, although some of the securing methods describe above with respect to either the unitary or independent lens implementations take advantage of the resilient characteristics of the bridge arms 422, securing methods that do not rely on any possible resilient characteristics of the bridge arms 422 may also be used. For example, nose pads 424 may be formed integrally with either the lenses 488 or the frames 487, and the lenses 488 or the frames 487 may be removed simultaneously with the nose pads 424.

Figure 14:
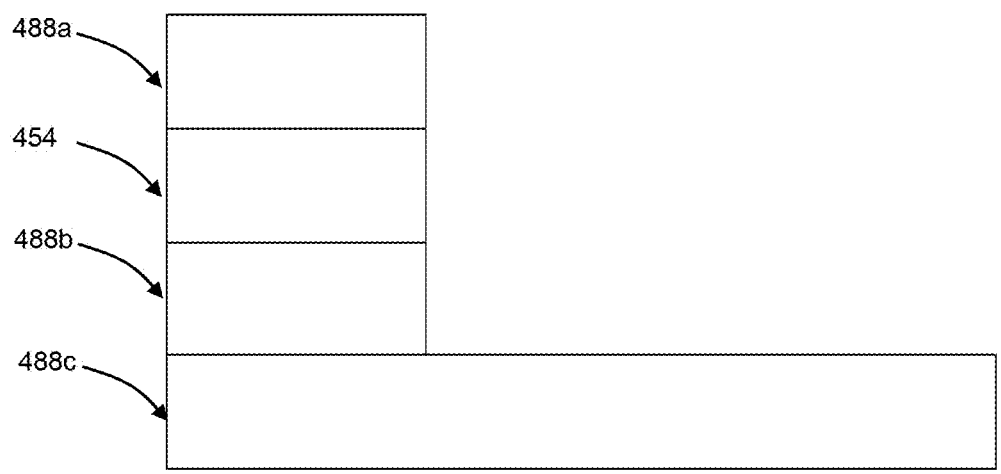
FIG. 14 shows a multi-lens arrangement for use with a wearable computer device according to one aspect of the disclosure.

According to another implementation, the device 410 may include a multi-lens arrangement to correct for nearsightedness (myopia) while still allowing the user to resolve the display. For example, the display 454 may have a focal point of anywhere between 2 meters and infinity, based on its particular arrangement and implementation. For this range of focal points, a nearsighted person would be unable to resolve the display 454 without a corrective lens between their eye and the display itself. As shown in FIG. 14, which is a top view of a lens arrangement according to one aspect of the disclosure, device 410 may include a plurality of lenses 488a-c that cooperate with display 454 to compensate for nearsightedness in an eye 490. The lenses 488a, b may be lenses having approximately the same profile as each other and as the display 454, when viewed from the perspective of a human eye while wearing device 410. The thicknesses of lenses 488a, b may vary according to the extremity of a user's nearsightedness. For example, for slight nearsightedness, lens 488a may be relatively thin and may have a prescription of approximately −1.00 diopters. For more severe cases of nearsightedness, lens 488a may be thicker and may have a prescription of increasingly negative magnitude in diopters, e.g., −10.00 diopters or greater. In the case of nearsightedness, lens 488b may be the inverse prescription of the prescription of lens 488b. For example, if lens 488a has a prescription of −1.00 diopters, lens 488b may have a prescription of +1.00 diopters. In this implementation, display 454 may be situated between lens 488a and 488b. This may allow for a user to resolve the projection provided by display 454. Lens 488c may then be situated furthest from the eye, with respect to lens 488a, b and display 454. In this way, lens 488c may correspond to the user's prescription, in the same way as lens 488a. Lens 488c may have an overall shape like that depicted for lens 488 in FIGS. 12A and B, and is not limited to the size or dimension of display 454, since lens 488c is provided to correct the overall vision of a user, and not just the projection of display 454.

Figure 15:
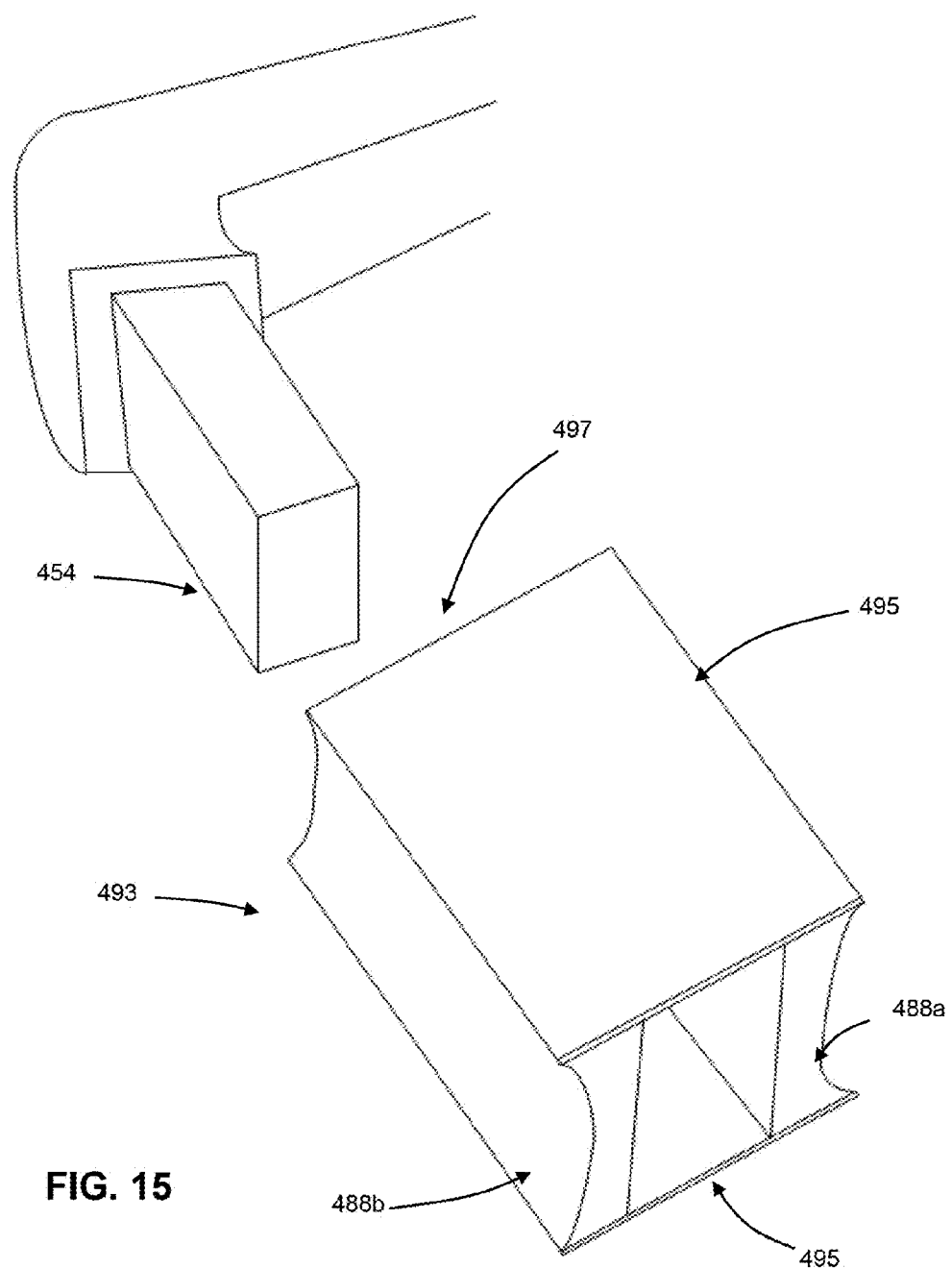
FIG. 15 shows a sleeve for use with a wearable computer device according to one aspect of the disclosure.

The lenses 488a, b may be joined to form a sleeve 493, such that the lenses 488a, b may attached and removed from the display 454 simultaneously, as shown in FIG. 15. In this example, the sleeve 493 may include the lenses 488a, b, as well as support surfaces 495. The support surfaces 495 may be formed of any material, such as a polymer, including plastic or the like. In one example, the support surfaces 495 may be formed of the same material as the band 412. The lenses 488a, b may be secured between the support surfaces at a fixed distance apart to form at least one opening 497 therebetween, such that the sleeve 493 may be slid over the display element 454 to allow for optical correction by the lenses 488a, b. In this way, the display element 454 fits within the opening 497 between the lenses 488a, b as well as the support surfaces 495. Although sleeve 493 is depicted as having two openings in FIG. 15, the sleeve may include an additional surface that connects between the two surfaces 495 such that the sleeve has only one opening. The lenses 488a, b may be secured to the surfaces 495 by any known fixation method, such as bonding, adhesive, mechanical fasteners, or the like. As discussed above, the prescriptions of lenses 488a, b may be any prescription to correct for vision impairments to allow a user to resolve the display 454, such as any of the prescriptions described above.

In another example, one or both of the lenses 488a, b may be tinted to provide protection from excess sunlight. In this way, the lenses 488a, b may include an additional photochromic coating on any surface of the lens, or alternatively, the lens itself may be tinted or colored. In yet another example, one or both of the lenses 488a, b, as well as the display 454, may be polarized in any direction. For example, the lens 488b may be polarized to improve the contrast of the image produced by display 454. In a further example, both the display 454 and lens 488b can be polarized in a direction normal to the direction in which sleeve 495 is slid onto display 454. The polarization can be further configured such that by sliding sleeve 495 along display 454 by a distance equal to about half of the phase of the polarization, the overall appearance of the display 454 can be changed from transparent to opaque. Such an opaque configuration can allow the user to view only the image presented on the display 454 itself, if desired. The above examples, including tinted or polarized lenses, the lenses 488a, b may include any combination of prescription or nonprescription lenses.

In another implementation, the lenses 488a, b may be formed integrally with display 454, or alternatively may be removably secured. Although lenses 488a-c and display 454 are depicted as abutting in FIG. 14, it is understood that they may be arranged according to any spacing desired. In this way, some of the lenses 488a,b may abut the display 454, while some may be spaced apart. The lens 488c may also be spaced apart from any of the other lenses 488a,b, and alternatively may be directly abutting either one of lenses 488a, b.

In an alternative implementation, lenses 488a, b may not be used, and only lens 488c may be oriented opposite the display 454 with respect to a user's eye 490. In this implementation, a user with farsightedness may resolve the projection of display 454 without the need for additional lenses 488a, b.

In yet another implementation, lens 488c may be a progressive lens, with a portion of the lens being a user's prescription and another portion of the lens corresponding to the display 454. For example, the lens 488c may include a portion which corresponds to an overall outline of the display 454, when viewed from a user wearing the device 410. This portion may include one or more layers of corrective lenses of any type of diopter measurement in order to correct for an ocular disorder.

Although the description herein has been made with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims.

The invention claimed is:

1. A head-wearable device, comprising:
   a center frame support;
   a first side arm extending from a first end of the center frame support;
   a second side arm extending from a second end of the center support;
   a nosebridge including a crosspiece, the crosspiece being removably coupled to the center frame support;
   at least one lens attached to the crosspiece; and
   a display element attached to at least one of the first side arm or the second side arm and positionable adjacent the at least one lens.

2. The device of claim 1, wherein the center frame support comprises a connection section, and the crosspiece of the nosebridge is removably coupled to the connection section of the center frame support.

3. The device of claim 1, further comprising:
at least one frame attached to the crosspiece, the at least one frame securing the at least one lens.

4. The device of claim 1, wherein the nosebridge further comprises a pair of nose pads.

5. The device of claim 1, wherein the at least one lens is positionable between the display element and an eye of a user when the device is worn on the user's head.

6. The device of claim 1, wherein the display element is positionable between at least one lens and an eye of a user when the device is worn on the user's head.

7. The device of claim 1, further comprising:
an extension arm configured to present information to the user via the display element, the extension arm extending at least partially along the first side arm on a first side of the center frame support and further extending from the first side arm to a display end that supports the display element in a position on a second side of the center support, the extension arm including a joint therein configured for movement of the display element at least in a direction having a lateral component relative to the center frame support.

8. The device of claim 1, wherein the center frame support and the first and second side arms are configured as a band extending between first and second ends respectively positioned on the first and second side arms, the first and second ends being remote from the center frame support and spaced apart from each other at a first distance, and wherein the band is resiliently deformable to selectively increase the first distance.

9. The device of claim 8, wherein the end of the first side arm is elongated relative to the free of the second side arm to form an asymmetric U shape.

10. The device of claim 8, wherein the end of the first side arm is enlarged relative to the end of the second side arm, the enlarged end housing at least one of circuitry and a power source employed by the display element.

11. The device of claim 10, wherein:
the asymmetric U shape provides multiple points of contact for the user's head; and
the enlarge end of the first side arm provides a balancing weight relative to the extension arm.

12. The device of claim 10, wherein the enlarged end includes a plurality of electrical contacts to connect an external device with the at least one of the circuitry and the power source.

\* \* \* \* \*